United States Patent
Sweere et al.

[19]

[11] Patent Number: 5,842,672

[45] Date of Patent: Dec. 1, 1998

[54] MOUNTING SYSTEM FOR FLAT PANEL DISPLAY, KEYBOARD AND STAND

[75] Inventors: Harry C. Sweere, Minneapolis; Michael D. Gonnerman; Donald M. Voeller, both of Eagan, all of Minn.

[73] Assignee: Ergotron, Inc., St. Paul, Minn.

[21] Appl. No.: 660,397

[22] Filed: Jun. 7, 1996

[51] Int. Cl.⁶ .............................. E04G 3/00; F16M 11/12
[52] U.S. Cl. ............................ 248/278.1; 248/280.11; 248/284.1; 248/921; 248/923
[58] Field of Search ........................... 248/278.1, 280.11, 248/281.11, 284.1, 917, 919, 920, 921, 922, 923, 918

[56] References Cited

U.S. PATENT DOCUMENTS

| | | | |
|---|---|---|---|
| D. 279,007 | 5/1985 | Empson et al. | D14/113 |
| D. 289,873 | 5/1987 | Gemmell et al. | D14/113 |
| D. 295,415 | 4/1988 | Thies et al. | D14/114 |
| D. 310,358 | 9/1990 | Nuttall et al. | D14/113 |
| D. 312,630 | 12/1990 | Esslinger | D14/113 |
| D. 313,405 | 1/1991 | Barry et al. | D14/113 |
| D. 317,912 | 7/1991 | Takai | D14/113 |
| D. 319,435 | 8/1991 | Brown | D14/113 |
| D. 326,847 | 6/1992 | Savio | D14/113 |
| D. 337,104 | 7/1993 | Orchard | D14/113 |
| D. 339,796 | 9/1993 | Goodner et al. | D14/113 |
| D. 344,933 | 3/1994 | Wiseman et al. | D14/113 |
| D. 348,449 | 7/1994 | Rodd et al. | D14/113 |
| D. 349,489 | 8/1994 | Wang | D14/113 |
| D. 354,052 | 1/1995 | Imai | D14/113 |
| D. 354,952 | 1/1995 | Rodd | D14/113 |
| D. 357,468 | 4/1995 | Rodd | D14/113 |
| 1,328,677 | 1/1920 | Hodny | 248/278.1 |
| 1,380,121 | 5/1921 | Stitzer | 248/278.1 X |
| 1,476,758 | 12/1923 | Hodny | 248/278.1 X |
| 3,981,340 | 9/1976 | Anderson et al. | 248/345.1 |
| 4,183,489 | 1/1980 | Copher et al. | 248/278.1 |
| 4,365,561 | 12/1982 | Tellier et al. | 108/7 |
| 4,368,867 | 1/1983 | Pendleton et al. | |
| 4,438,458 | 3/1984 | Munscher | 358/254 |
| 4,447,031 | 5/1984 | Souder, Jr. et al. | 248/921 X |
| 4,453,687 | 6/1984 | Sweere | 248/183.3 |
| 4,542,872 | 9/1985 | Marino et al. | |
| 4,562,987 | 1/1986 | Leeds et al. | 248/921 X |
| 4,605,188 | 8/1986 | Goetz | |
| 4,616,218 | 10/1986 | Bailey et al. | |
| 4,632,349 | 12/1986 | Anstey | 248/281.11 |
| 4,691,886 | 9/1987 | Wendling et al. | |
| 4,703,909 | 11/1987 | Dayton et al. | 248/280.11 |
| 4,729,533 | 3/1988 | Hillary et al. | |
| 4,768,744 | 9/1988 | Leeds et al. | |
| 4,826,123 | 5/1989 | Hannah et al. | 248/281.11 X |
| 4,834,329 | 5/1989 | Delapp | |
| 4,836,478 | 6/1989 | Sweere | |
| 4,836,486 | 6/1989 | Vossoughi et al. | |
| 4,844,387 | 7/1989 | Sorgi et al. | 248/281.11 X |
| 4,846,434 | 7/1989 | Krogsrud | |
| 4,852,842 | 8/1989 | O'Neill | |
| 4,919,387 | 4/1990 | Sampson | 248/921 |
| 4,953,822 | 9/1990 | Sharber et al. | |
| 4,989,813 | 2/1991 | Kim et al. | |
| 4,997,031 | 3/1991 | Kashiwada et al. | |
| 5,016,849 | 5/1991 | Wu | |
| 5,034,858 | 7/1991 | Kawamoto et al. | |
| 5,037,053 | 8/1991 | Fox et al. | 248/281.11 X |
| 5,049,862 | 9/1991 | Dao et al. | |
| 5,082,352 | 1/1992 | Kawagishi et al. | |
| 5,085,394 | 2/1992 | Torii | 248/455 |
| 5,088,676 | 2/1992 | Orchard et al. | 248/421 |
| 5,092,552 | 3/1992 | Dayton et al. | |
| 5,108,063 | 4/1992 | Koerber, Sr. et al. | 248/284.1 |

(List continued on next page.)

*Primary Examiner*—Ramon O. Ramirez
*Assistant Examiner*—Stephen S. Wentsler
*Attorney, Agent, or Firm*—Hugh D. Jaeger

[57] ABSTRACT

Multi-jointed and pivoted support system for support of a flat panel video display and/or keyboard tray, incorporating a plurality of pivot points providing for pivotal motion of one or more components about a plurality of vertical, horizontal and elevational axis. Support arms having elevational pivot assemblies, including plastic friction washers and nitrogen gas springs which offer elevational arm control requiring constant and predetermined positioning effort on the part of the video display operator and keyboard operator.

42 Claims, 29 Drawing Sheets

U.S. PATENT DOCUMENTS

| | | |
|---|---|---|
| 5,160,098 | 11/1992 | Durkos . |
| 5,168,429 | 12/1992 | Hosoi . |
| 5,173,686 | 12/1992 | Fujihara . |
| 5,193,069 | 3/1993 | Furuya . |
| 5,209,448 | 5/1993 | Hatanaka et al. .......................... 248/455 |
| 5,249,103 | 9/1993 | Forsythe . |
| 5,250,888 | 10/1993 | Yu . |
| 5,255,214 | 10/1993 | Ma . |
| 5,329,289 | 7/1994 | Sakamoto et al. . |
| 5,335,142 | 8/1994 | Anderson . |
| 5,345,362 | 9/1994 | Winkler . |
| 5,375,076 | 12/1994 | Goodrich et al. . |
| 5,379,182 | 1/1995 | Fujimori et al. . |
| 5,400,993 | 3/1995 | Hamilton . |
| 5,410,447 | 4/1995 | Miyagawa et al. . |
| 5,501,420 | 3/1996 | Watt et al. ........................... 248/923 X |
| 5,630,648 | 5/1997 | Allard et al. ............................ 297/327 |
| 5,738,316 | 4/1998 | Sweere et al. ..................... 248/123.11 |

MOUNTING SYSTEM FOR FLAT PANEL DISPLAY, KEYBOARD AND STAND

CROSS REFERENCES TO CO-PENDING APPLICATIONS

None.

BACKGROUND OF THE INVENTION

1. Field of the Invention

The present invention is for a positionable support arm or stand, and more particularly pertains to a multi-pivoted support arm system for arms or stands for viewing a flat panel display screen or operating a keyboard.

2. Description of the Prior Art

Prior art positionable support arms have incorporated ball gimbals, simple knob operated pivot mounts, angular slots and control arms or spring devices which are adjusted to maintain position of a flat panel display screen while offering pivotable capabilities about a small number of pivot centers. Often the lack of a sufficient amount of pivots limited the positionable capabilities of the support arm and the panel display screen about a sufficient number of pivotal axii. Lack of friction control and dynamic lift capability makes adjustment of the flat panel display difficult and requires the use of two hands to accomplish an adjustment. Additionally, movement of the support arm and panel display screen payload in a downward direction against a friction pivot style joint generally was accomplished easily as the weight of the display screen acted in conjunction with gravitational forces and readily overcomes the frictional qualities of the friction pivot style joint. However, movement in an upward direction is not as easily and readily accomplished as the upward force required to raise the display screen had to overcome the friction of the friction style joint as well as the force of gravity. In addition, two handed adjustments add to the complexity of adjusting the display. Clearly what is needed is a positional panel display screen mounting system which is positionable over a multitude of axis, which can be repositioned without secondary controls, which incorporates an adjustable counterbalance or lifting system to provide "co-equal" movement force in either the upward or downward directions, and which incorporates frictional systems which can be used to establish pre-determined moving forces within OSHA guidelines and which provides a stable display for touch screen applications.

SUMMARY OF THE INVENTION

The general purpose of the present invention is a multi-jointed, pivoted support arm for support and position of a flat panel display screen or a keyboard.

According to one embodiment of the present invention, there is provided a multi-jointed and pivoted support arm for positioning of a flat panel display screen including a mounting bracket, an arm azimuthal pivot, an elevational pivot, an adjustable load counterbalance system, a display pivot, a display rotation pivot and an interface coupling acting in concert to support and provide positioning for a flat panel display screen or any other desired object such as a keyboard.

The frictional pivot mount is an unique tilt resistive device that relies on the unique properties of a family of polymer materials having a static and dynamic coefficient of friction which substantially is identical, such as Delrin or other ultra high molecular weight polyethylene (UHMWPE) materials. The static and dynamic coefficients of UHMWPE materials, such as utilized in the washers, and the unique result of this frictional pivot tilt restraining device is that a flat panel display remains in any tilt position selected by the user. If the user wishes to tiltingly reposition the flat panel display upwardly or downwardly, or any other position, the flat panel display must be manually repositioned to overcome the frictional pivot tilt restraining device. Once the flat panel display is tilted to a different selected position, the unique frictional pivot tilt restraining device resistably restrains the flat panel display in the new position as selected. Sufficient friction to maintain position of the flat panel display during use is provided, and yet allows easy "breakaway" release to reposition the flat panel display to a new operating position or to the storage position. The unique characteristics of the polymer material allows smooth tilt adjustment of the frictional pivot tilt mechanism, and yet, provides a constant frictional memory for the preset position of the flat panel display. A horizontal predetermined poise is required of the operator to reposition the flat panel display at which time it remains in the new position.

One significant aspect and feature of the present invention is a multi-jointed and pivoted support arm system for a flat panel display screen or flat panel monitor.

Another significant aspect and feature of the present invention is a multi-jointed and pivoted support arm system for a flat screen display which is positionable at any point within the arm's given range of travel.

Yet another significant aspect and feature of the present invention is a plurality of pivots incorporating ultra high molecular weight polyethylene (UHMWPE) washers the subject of a pending patent application.

Still another significant aspect and feature of the present invention is a plurality of pivots including an arm azimuthal pivot, an arm elevational pivot, a display roll pivot, a display tilt pivot and a display rotation pivot.

A further significant aspect and feature of the present invention is an interface connecting the display rotation pivot to the display rotation point.

A still further significant aspect and feature of the present invention is a load counterbalance mechanism adjuster whose location and angle of adjustment in respect to the arm elevational pivot is derived through the use of a computerized mathematical algorithm for each mounting option or orientation offered in the system, to provide a user adjustable optimum counterbalance force pivot point for a broad range of display or payload weight.

A still further significant aspect and feature of the present invention is a load counterbalance mechanism which provides a dynamically increasing counterbalance moment which corresponds to the increasing moment load on the arm as the arm transverses from 0° vertical to 90° horizontal and which dynamically decreases as the arm moves downward from 90° horizontal to 180° vertical to provide a linear counterbalance force throughout the arm's total adjustable range.

A still further significant aspect and feature of the present invention is a nitrogen gas spring counterbalance mechanism which operates physically within the pivot point of the pivotal arm allowing 180° (±90°) rotation of the display or other load.

A still further significant aspect of the present invention is an arm elevation frictional pivot, independent of the arm counterbalance system, which provides for establishment of a predetermined, bi-directional frictional moving force which allows single-handed movement of the display within OSHA guidelines and yet provides a stable viewing or operating platform for touch screen or keyboard applications.

Having thus described embodiments of the present invention, it is the principal object of the present invention to provide a multi-jointed and pivotable support system for a flat panel video display or a keyboard.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
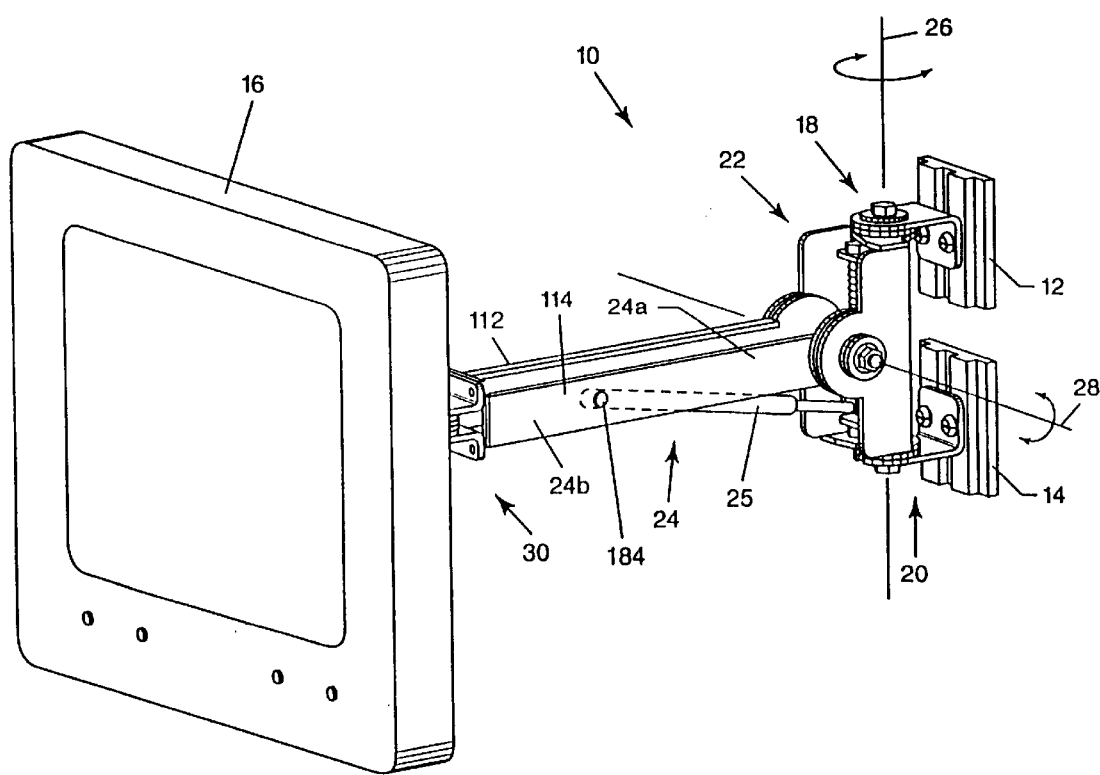
FIG. 1 illustrates a perspective view of a flat panel display arm, of the present invention.

FIG. 1 illustrates a perspective view of flat panel display arm 10, the present invention secured to wall mount track plates 12 and 14 and supporting a flat panel display 16. Angled bracket assemblies 18 and 20 secure suitably to the track plates 12 and 14 to support a pivotal configured support bracket 22 and its associated components. Pivotal support bracket 22 serves as a pivotal mount for support arm 24 and other associated components including a gas spring 25 and a right and left support arm members 112 and 114 respectively. Gas spring 25 secures between the pivotal support bracket 22 and the support arm 24 as later described in detail. The pivotal support bracket 22 pivots about vertical axis 26 to carry the support arm 24, a three axis pivot 30 and the flat panel display 16 as a unit about the vertical axis 26. Support arm 24 pivotally secures to the pivotal support bracket 22 to offer movement of the support arm 24, the three axis pivot 30 and the flat panel display 16 as a unit about the horizontal axis 28. The three axis pivot 30, as described later in detail, secures at the outboard end 24b of the support arm 24 to support the flat panel display 16.

Figure 2:
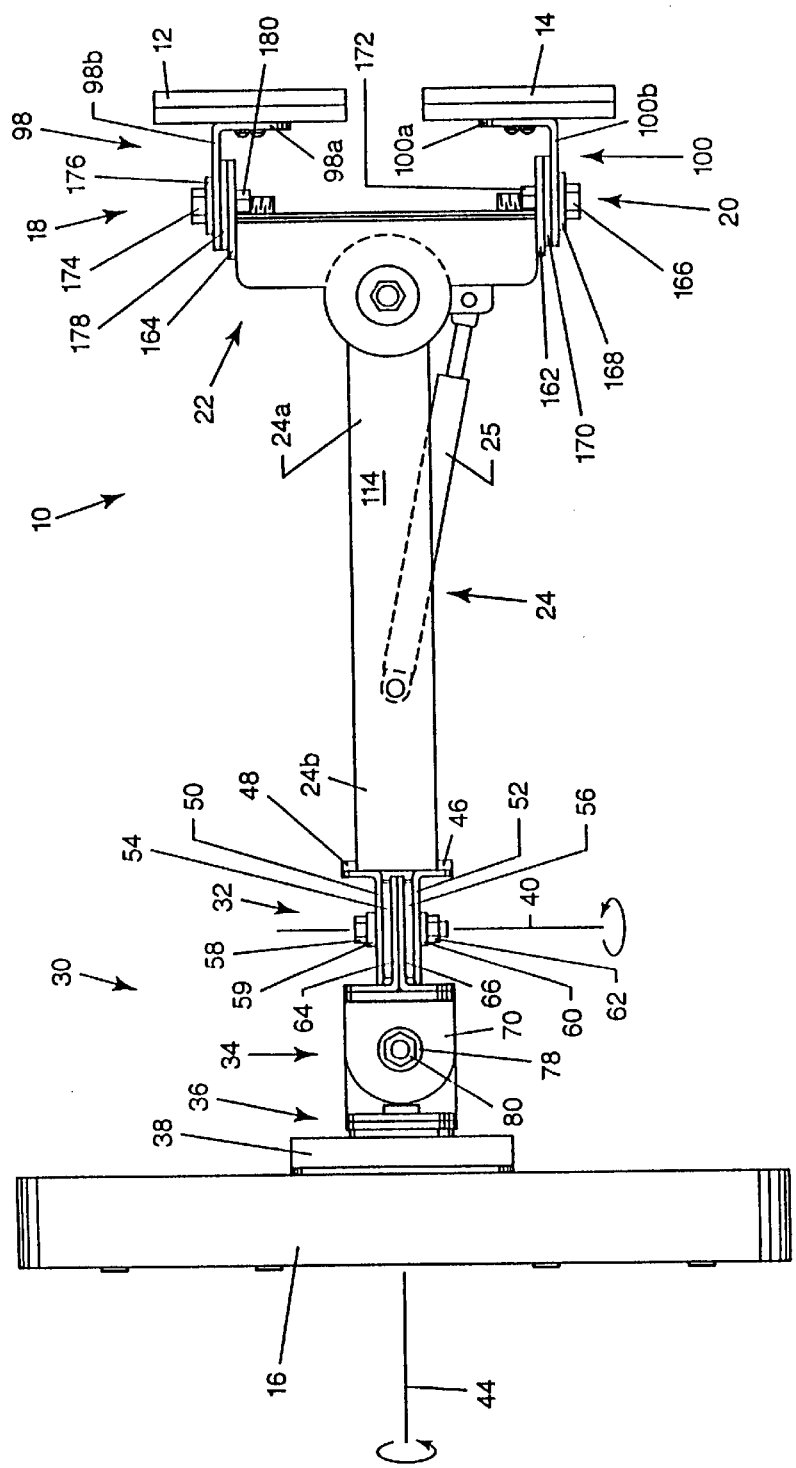
FIG. 2 illustrates a side view of a flat panel display arm.
Figure 4:
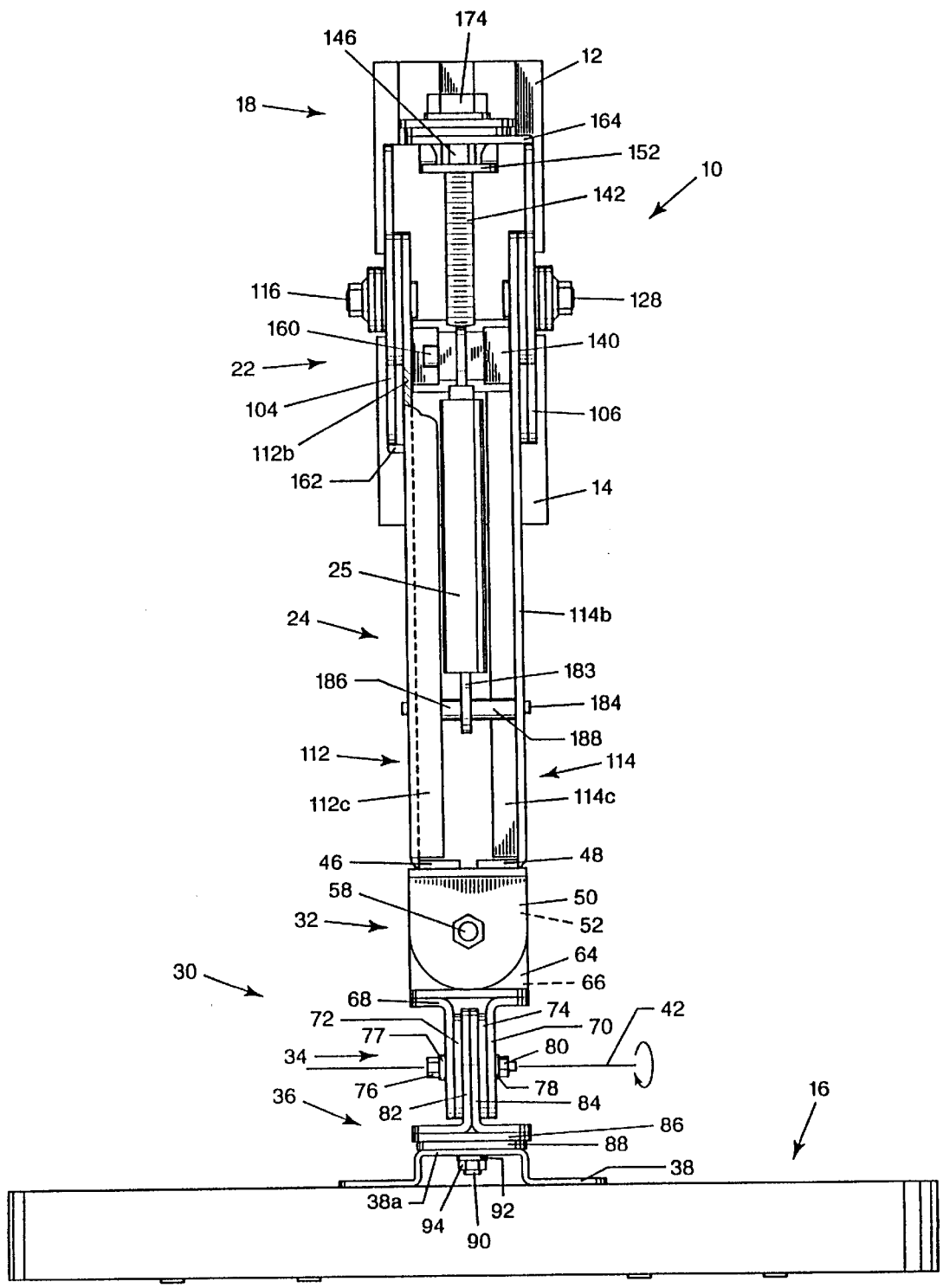
FIG. 4 illustrates a front view of a flat panel display arm.

FIG. 2 illustrates a side view of the elements of FIG. 1, where all numerals correspond to those elements previously described. Illustrated in particular is the three axis pivot 30 including pivot assemblies 32, 34 and 36 suitably secured between the outboard end 24b of support arm 24 and a bracket 38 on the rear surface of the flat panel display 16. The inboard end 24a of the support arm is pivotally secured to the pivotal support bracket 22 to provide elevational pivotal positioning of the support arm 24 and its payload about the horizontal axis 28 illustrated in FIG. 1. The three axis pivot 30 and the flat panel display 16 can be elevationally positioned about the horizontal axis 28 in conjunction with and by the action of the pivoted support arm 24. As viewed in FIG. 2, pivot assembly 32 offers rotation of the members outboard of the pivot assembly 32, that is to say, pivot assemblies 34, 36 and flat panel display 16 about the vertical axis 40 extending through the pivot assembly 32. Pivot assembly 34 offers rotation of the members outboard of the pivot assembly 34, that is to say, pivot assembly 36 and flat panel display 16, about a horizontally aligned axis 42 extending through the pivot assembly 34 as illustrated in FIG. 4. Pivot assembly 36 offers rotation of the members outboard of the pivot assembly 36, that is to say, flat panel display 16, about a roll axis 44 extending through the pivot assembly 36.

The pivot assembly 32, of the three axis pivot 30, secures to vertically oriented flanges 46 and 48 extending from members of the support arm 24.

Now, with reference to FIGS. 2 and 4 the three axis pivot assembly 30 is described. Pivot assembly 32 includes angle brackets 50 and 52 secured to support arm flanges 46 and 48 at end 24b of the support arm 24, UHMWPE disks 54 and 56 aligned to the inner planar surfaces of angle brackets 50 and 52, respectively, and a bolt 58 having two Belleville spring washers 59 and 60 and nut 62. Aligned to the interior surfaces of the UHMWPE disks 54 and 56 are the horizontally aligned portions of angle brackets 64 and 66 which extend outwardly to present the flanged portions for mating to pivot assembly 34. Bolt 58 extends through the brackets 50, 52, 64 and 66, UHMWPE disks 54 and 56, and Belleville spring washers 59 and 60 and nut 62. Bolt 58 is tensioned across the assembly to provide suitable friction to stabilize pivot assemblies 34 and 36 and flat panel display 16. Pivot assembly 34, constructed in the same manner and fashion as pivot assembly 32, includes angle brackets 68 and 70 secured to the vertical portions of angle brackets 64 and 66 of the pivot assembly 32, UHMWPE disks 72 and 74 aligned to the inner surfaces of angle brackets 68 and 70,respectively, and a bolt 76 having two Belleville spring washers 77 and 78 and nut 80. Aligned to the interior surfaces of the UHMWPE disks 72 and 74 are the vertically aligned portions of angle brackets 82 and 84 which extend outwardly to present the flanged portions for mating to pivot assembly 36. Bolt 76 extends through the brackets 68, 70, 82 and 84, UHMWPE disks 72 and 74, Belleville spring washers 77 and 78 and nut 80. Bolt 76 is tensioned across the assembly to provide suitable friction to stabilize pivot assembly 36 and flat panel display 16, preventing the pivot assembly 36 from falling due to its weight. The frictional tension is adjustable to accommodate various weights of flat panel displays. Pivot assembly 36 includes a plate 86 suitably secured to the flanges of the angle brackets 82 and 84, a UHMWPE disk 88, a planar portion 38a of bracket 38, a bolt 90, a Belleville washer 92 and a nut 94. Bolt 94 extends through the plate 86, UHMWPE washer 88, planar area 38a, Belleville spring washer 92 and nut 94 and is adjusted to provide tension across the assembly to provide suitable friction.

It can be appreciated that an almost infinitesimal number of positionings of the flat panel display 16 are available incorporating the three axis swiveling of the flat panel display 16 at the three axis pivot assembly 30 and the horizontal and elevational positionability provided by the pivotal support bracket 22. In each case it can be appreciated that the flat panel display must be adjustable and yet stay in the position selected by the user. If the user wished to tiltingly reposition the display 16 upwardly, downwardly, left to right or in a circular plane, the display must be manually repositioned to overcome the friction imposed by pivot assemblies 32, 34 and 36. Once the display is moved to a different selected position, the unique tilt restraining devices inherent in pivot assemblies 32, 34 and 36 will resistably restrain the flat panel display 16 in the new position as selected. Sufficient friction to maintain position of the flat panel display 16 during the use is provided but allows easy "breakaway" release to reposition the display to a new operating position or a storage position. The unique characteristics of the polymer material UHMWPE disks 54, 56, 72, 74 and 88, combined with pressure supplied Belleville spring washers 59, 60, 77, 78 and 92 allow smooth adjustment of the flat panel display 16 and yet provide a constant frictional memory for the present position of the flat panel display 16. A predetermined poise is required of the operator to reposition the flat panel display 16 at which time it remains in the new position. Each pivot point is also adjustable to accommodate various flat panel displays and different length arms.

Figure 3:
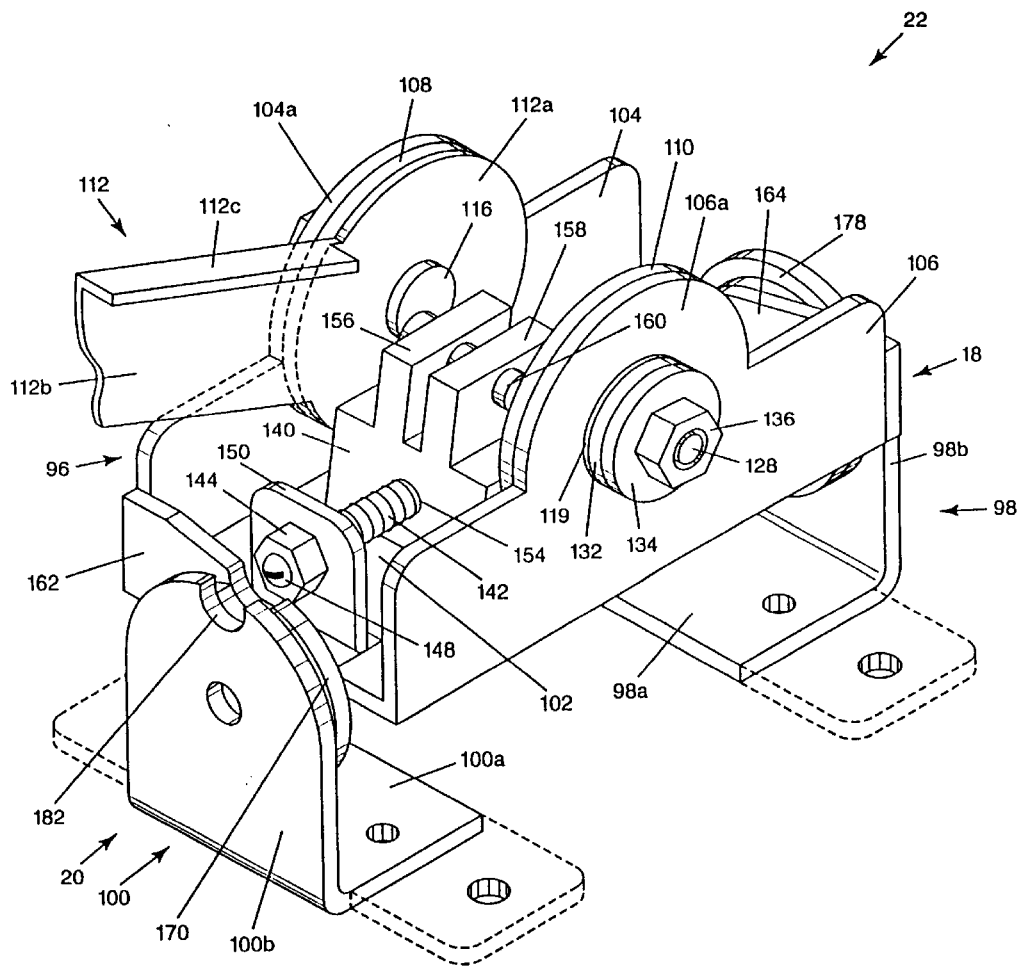
FIG. 3 illustrates a rotated isometric view of a pivotal support bracket.
Figure 5:
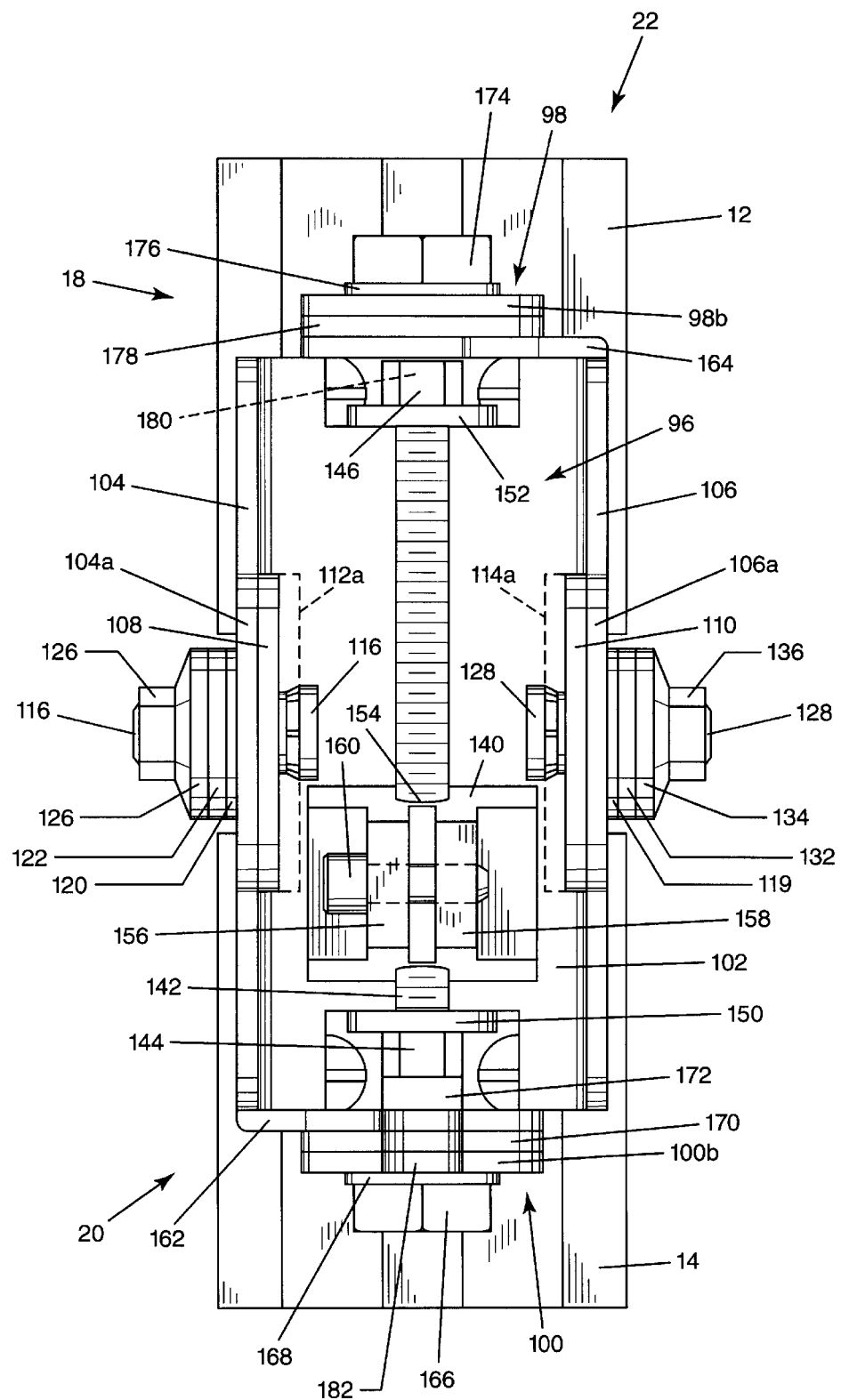
FIG. 5 illustrates a front view of a pivotal support bracket.
Figure 6:
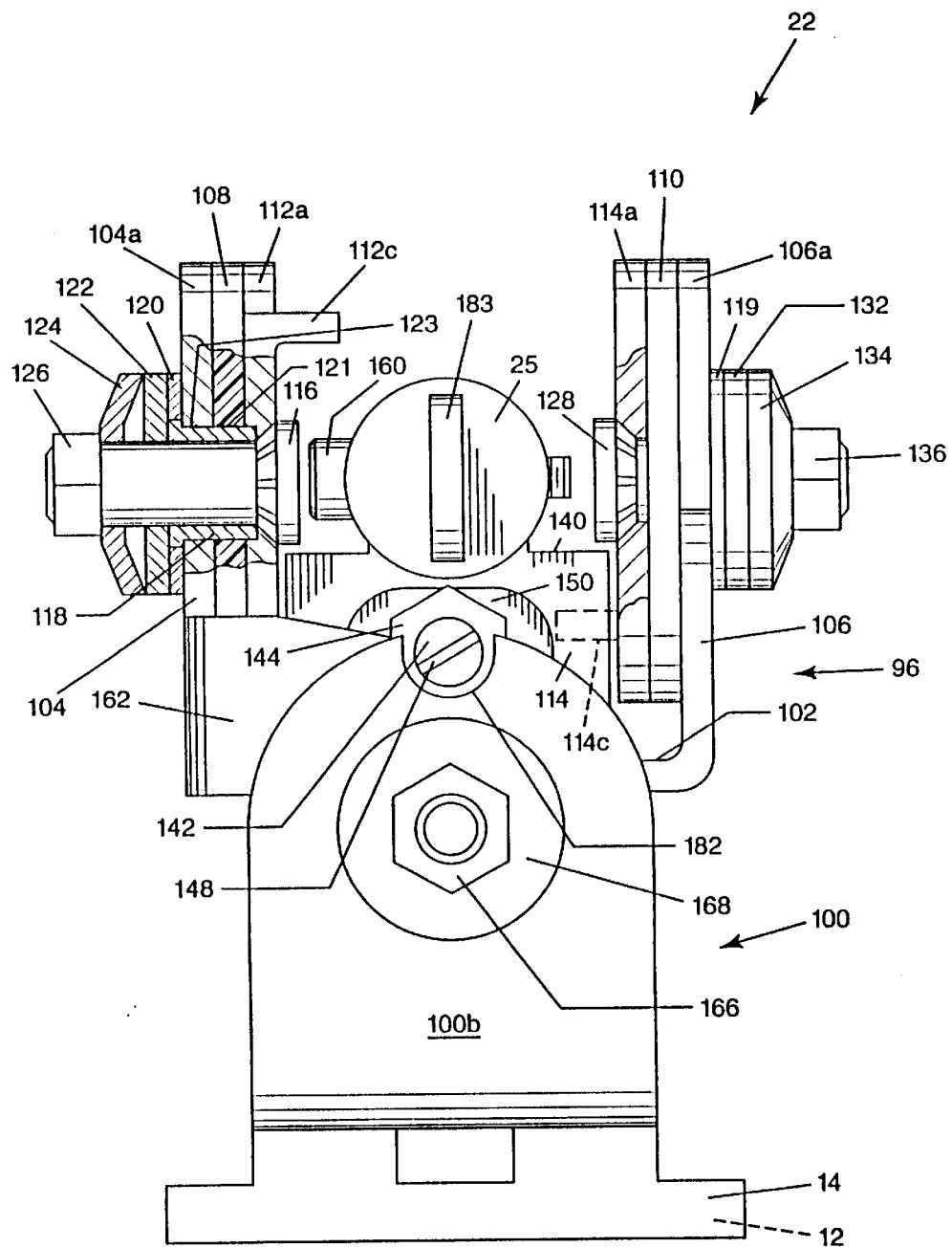
FIG. 6 illustrates a bottom view in partial cross section of a pivotal support bracket.

FIG. 3 illustrates a rotated isometric view of the pivotal support bracket 22, FIG. 5 illustrates a front view of the pivotal support bracket 22 secured to track plates 12 and 14, and FIG. 6 illustrates a bottom view in partial cross section of the pivotal support bracket 22 secured to track plates 12 and 14, where all numerals correspond to those elements previously described. With reference to FIGS. 3, 5 and 6 the support pivotal bracket 22 in now described. The pivotal support bracket 22 includes a central bracket 96 pivotally suspended between angled support brackets 98 and 100 which are part of angled bracket assemblies 18 and 20. Angled support brackets 98 and 100 include planar portions 98a and 100a, respectively, for mounting to track plates 12 and 14, illustrated in FIG. 1. Planar portions 98a and 100a may be manufactured with extra length, as illustrated by dashed lines, for mounting to a wall, a plate, a machine or other such surface. Planar portions 98b and 100b, having a rounded edge, extend at right angles from the planar portions 98a and 100a and pivotally secure to the central bracket 96 as later described in detail.

The central bracket 96 includes a planar area 102 having planar members 104 and 106 extending at right angles therefrom. Extending further from the planar members 104 and 106 are contiguous semi-circular members 104a and 106a, respectively, which align to UHMWPE disks 108 and 110 in concert with planar areas 104 and 106. Support arm member 24, illustrated in FIG. 1, includes a left member 112 and a right member 114. Referring to FIG. 3, left support arm member 112 includes a disk-like portion 112a corresponding to the size of the UHMWPE disk 108. A planar member 112b, having an angled support member 112c, extends from the disk-like portion 112a to form part of the support arm 24. Angled support members 112c and 114c also act as a stop on brackets 104 and 106, stopping the support arm 24 at a ±90° rotation. Right member 114 is not shown in FIG. 2 for purposes of brevity and clarity. FIG. 5 illustrates disk-like portion 112a and 114a of left and right support members 112 and 114 in dashed lines. FIG. 6 illustrates the left member and right members 112 and 114 in the down position but shows a full disk-like portion 112a (no cross section), and a cutaway view of the disk-like portion 114a for purposes of brevity and clarity. A captive stud 116 secures in the disk-like portion 112a of the left support arm member 112 and extends through an oilite bearing 118 and accompanying oilite washer 120 assembly centered about and along holes 121 and 123 in the UHMWPE disk 108 and the planar member 104, respectively, through a steel washer 122, a Belleville washer 124 and a nut 126. Nut 126 is adjusted to provide tension across the assembly to provide a predetermined suitable friction to stabilize the support arm member 112, pivot assembly, and the flat panel display 16 (not shown). The weight of the panel display 16 is counterbalanced by gas spring 25. In a similar fashion, a captive stud 128 secures in the disk-like portion 114a of the right support arm member 114 and extends through an oilite bearing similar to oilite bearing 118 (not shown) and accompanying oilite washer 119 assembly centered about and along holes in the UHMWPE disk 110 and the planar member 106, through a steel washer 132, a Belleville washer 134 and a nut 136.

A predetermined frictional force is thus established to insure that the vertical motion of support arm member 24 remains in any position selected by the user. If the user wishes to reposition the flat panel display 16 upwardly or downwardly, the display must be manually repositioned to overcome the arm member rotational friction established above. Once the flat panel display is moved to a different selected position, the unique friction devices will resistably restrain the flat panel display 16 in its new position as selected. Sufficient friction to maintain position of the flat panel display 16 during use is provided but allows easy "breakaway" release to reposition the flat panel display to a new operating position or to a storage position.

The unique characteristics of the polymer UHMWPE disks 108 and 110, in combination with a spring force supplied by Belleville washers 124 and 134 allow smooth adjustment of the display and yet provide a constant frictional memory for the preset position of the display. A predetermined poise is required of the operator to move the display, at which time it remains in the new position. This predetermined vertical positioning force is established and functions independently of the support arm 24 payload counterbalance which is performed by an adjustable gas spring assembly described below.

A positionable and adjustable gas spring mount 140 is adjustably mounted to adjustably slide along the central planar area 102 as positioned by a threaded shaft 142 having affixed nuts 144 and 146 at opposing ends. A slot 148 at the lower end of the threaded shaft 142 provides for rotational adjustability of the threaded shaft 142 and thus the gas spring mount 140 along the central planar area. The angle of planar area 102 and thus the angle of threaded adjustment shaft 142 in relation to the support arm 24 horizontal pivot axis 28 as shown in FIG. 1 is predetermined by a computerized mathematical algorithm for each mounting option or orientation to provide a user adjustable optimum counterbalance force pivot point corresponding to the specific weight of the flat panel display 16 mounted on support arm member 24. See FIGS. 18, 19 and 23 for examples of threaded shaft 142, 424 and 642 set at different adjustment angles for each mounting option. It should be noted that positionable and adjustable gas spring mount 140 is positionable in the space between left support arm member 112 and right support arm member 114 up to and intersecting with the support arm 24 horizontal axis 28 as shown in FIG. 1, allowing the support arm 24 to rotate and counterbalance a variable payload in a range of 0° to 180°. Tabs 150 and 152 extend outwardly from the central planar area 102 to support the ends of the threaded shaft 142 by means of holes located in the tabs 150 and 152 through which the threaded shaft 142 passes. A threaded hole 154 central to the gas spring mount 140 accommodates the threaded shaft 142 for purposes of adjustment of the gas spring mount 140. Gas spring mount 140 also includes opposed tabs 156 and 158. A pivot bolt 160 passes through the opposed tabs 156 and 158 to serve as a mount for one end of the gas spring 25. The outboard end 183 of the gas spring 25 secures to a pivot pin 184 passing through left and right support arm members 112 and 114 as illustrated in FIG. 4.

The load counterbalance mechanism provides a dynamically increasing counterbalance moment which corresponds to the increasing moment load on the arm as the arm transverses from 0° vertical to 90° horizontal and which dynamically decreases as the arm moves downward from 90° horizontal to 180° vertical to provide a linear counterbalance force throughout the arm's total adjustable range.

Pivot tab members 162 and 164 extend at right angles from the planar members 104 and 106, respectively, to form a portion of angled bracket assemblies 20 and 18. At angled bracket assembly 20 a bolt 166 passes through a Belleville washer 168, through angled support bracket member 100b, through a UHMWPE washer 170, through pivot tab 162 and secures into a threaded insert 172 secured to the inner wall of the pivot tab 162. Bolt 166 is adjusted to provide desirable frictional properties across the assembly. In a similar fashion, and at angled bracket assembly 18 a bolt 174 passes through a Belleville spring washer 176, through angled support bracket member 98b, through a UHMWPE washer 178, through pivot tab 164 and secures into a threaded insert 180 (directly below nut 146 in FIG. 4) secured to the inner wall of the pivot tab 164. Bolt 174 is adjusted to provide desirable frictional properties across the assembly. This friction stabilizes the entire assembly as it pivots about vertical axis 26 shown in FIG. 1. A semi-circular slot 182 passes through the angled support bracket 100b, UHMWPE washer 170 and through pivot tab 162 for adjustability access to the slot 148 in the end of the threaded shaft 142. UHMWPE washer 170 is positioned and secured with respect to the angled support bracket 100 by means of mutually engaged interlock tabs (not illustrated) to prevent washer rotation and secure alignment of the semi-circular slot 182 common to the UHMWPE washer 170, pivot tab 162 and angled support bracket 100b.

FIG. 4 illustrates a front view of the flat panel display arm 10 in the fully lowered position with attached three axis pivot 30 and flat panel display 16, where all numerals correspond to those elements previously described. Illustrated in particular is a view of the three axis pivot and of the gas spring 25 secured between the gas spring mount 140 and the pivot pin 184, with spacers 186 and 188, in the support arm 24.

FIG. 5 illustrates a front view of the pivotal support bracket 22 secured to track plates 12 and 14, where all numerals correspond to those elements previously described.

FIG. 6 illustrates a bottom view in partial cross section of the pivotal support bracket 22 secured to track plates 12 and 14, where all numerals correspond to those elements previously described.

MODE OF OPERATION

Figure 7:
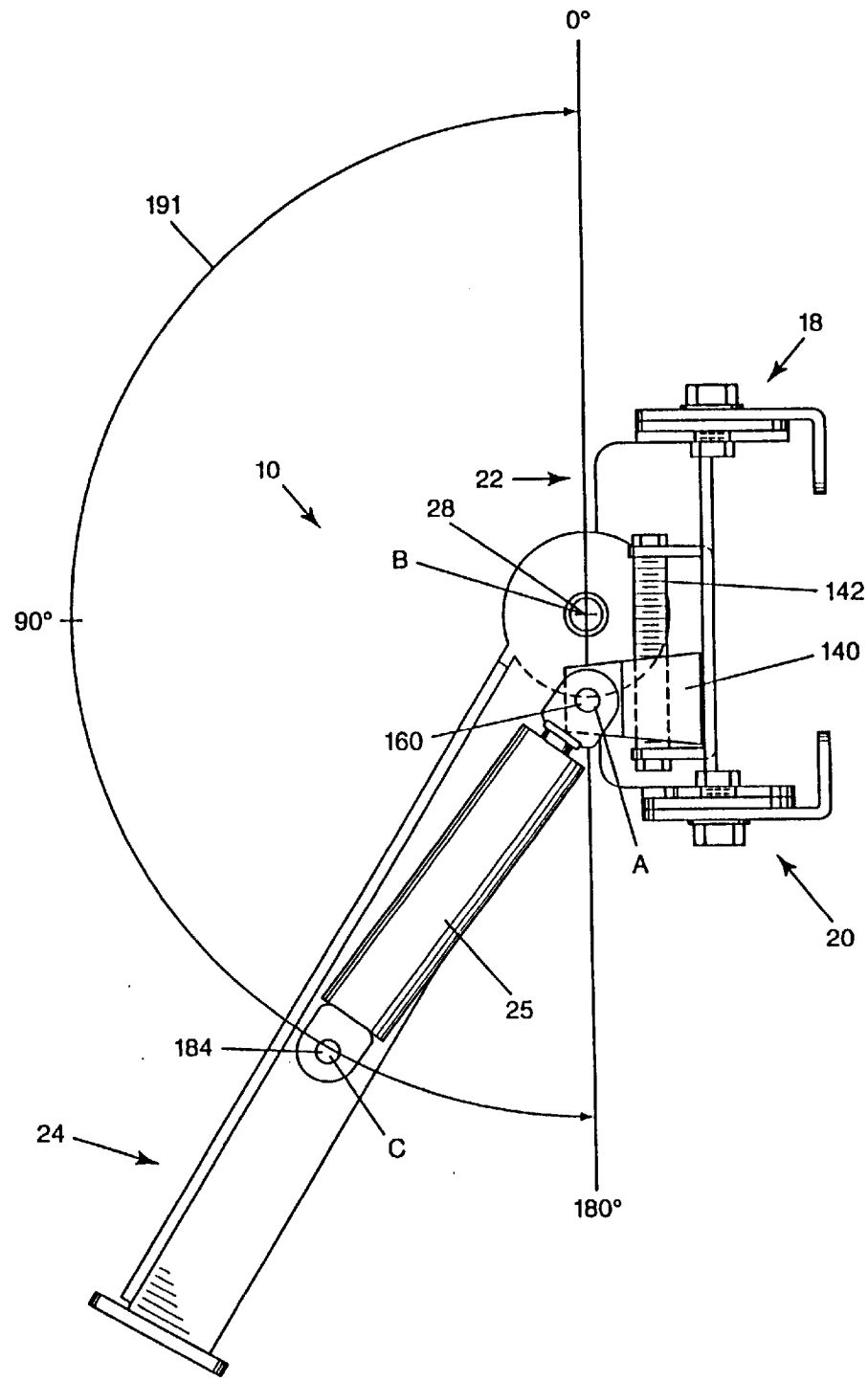
FIG. 7 illustrates a partial cutaway view of a flat panel display arm.

FIG. 7 illustrates a side view of the 180° pivot range 191 of support arm 24 about horizontal axis 28 as shown in FIG. 1.

Figure 8:
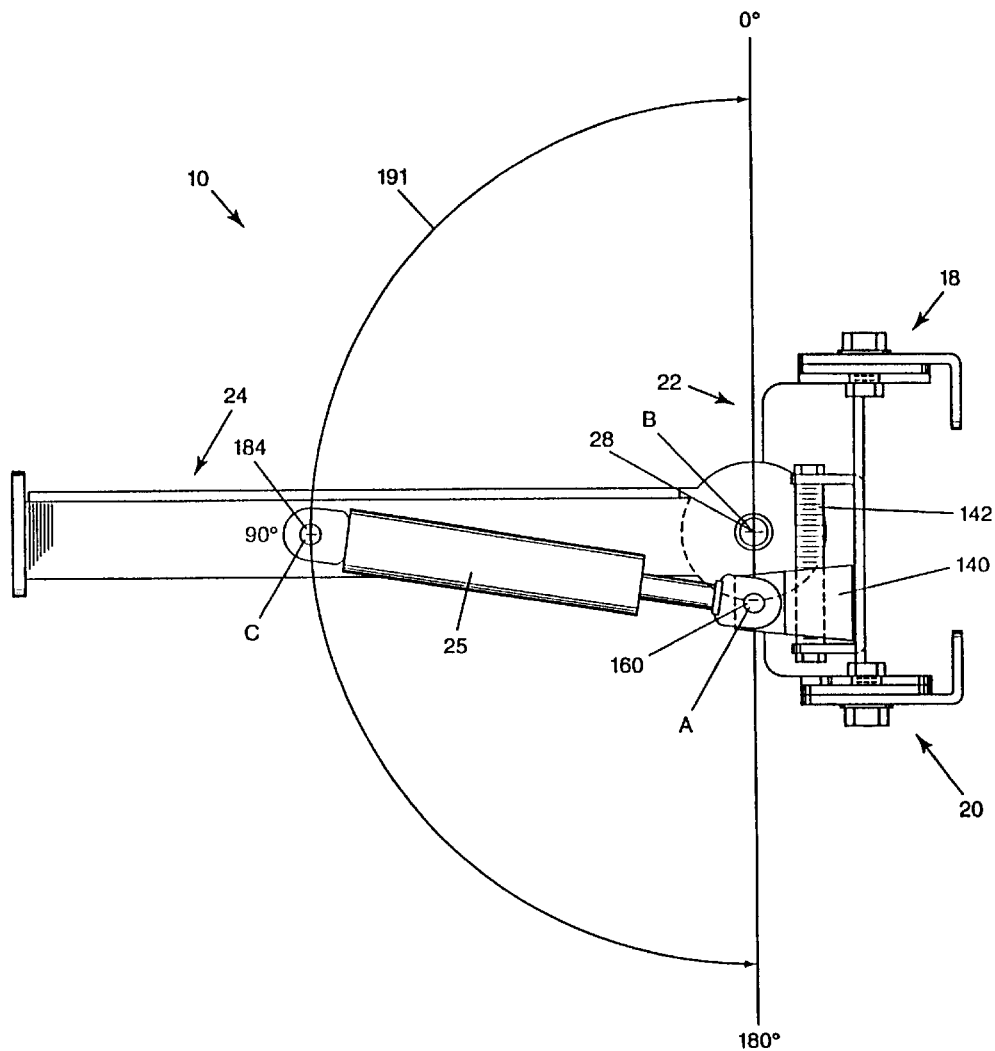
FIG. 8 illustrates a partial cutaway view of a flat panel display arm.
Figure 9:
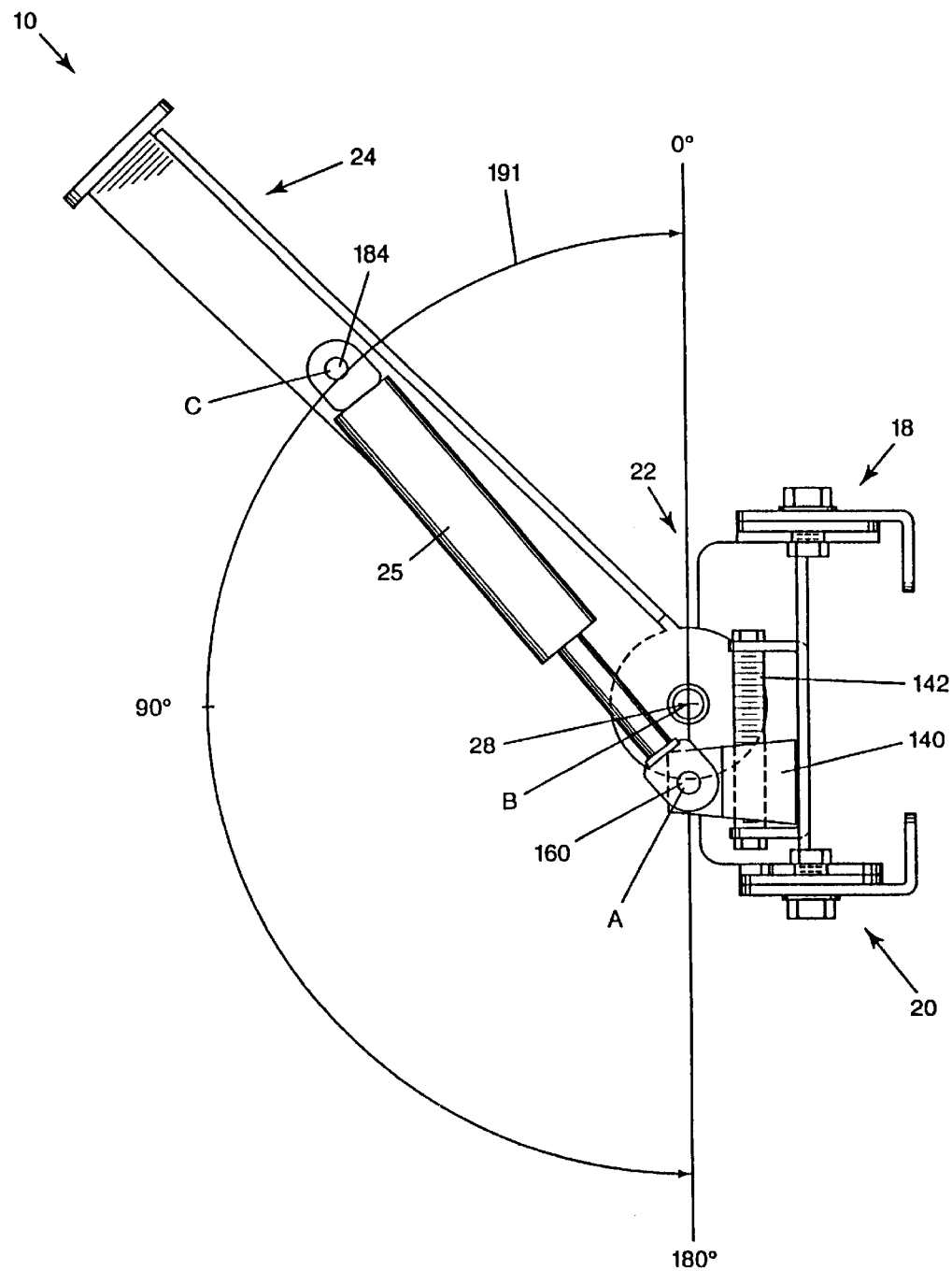
FIG. 9 illustrates a partial cutaway view of a flat panel display arm.
Figure 10:
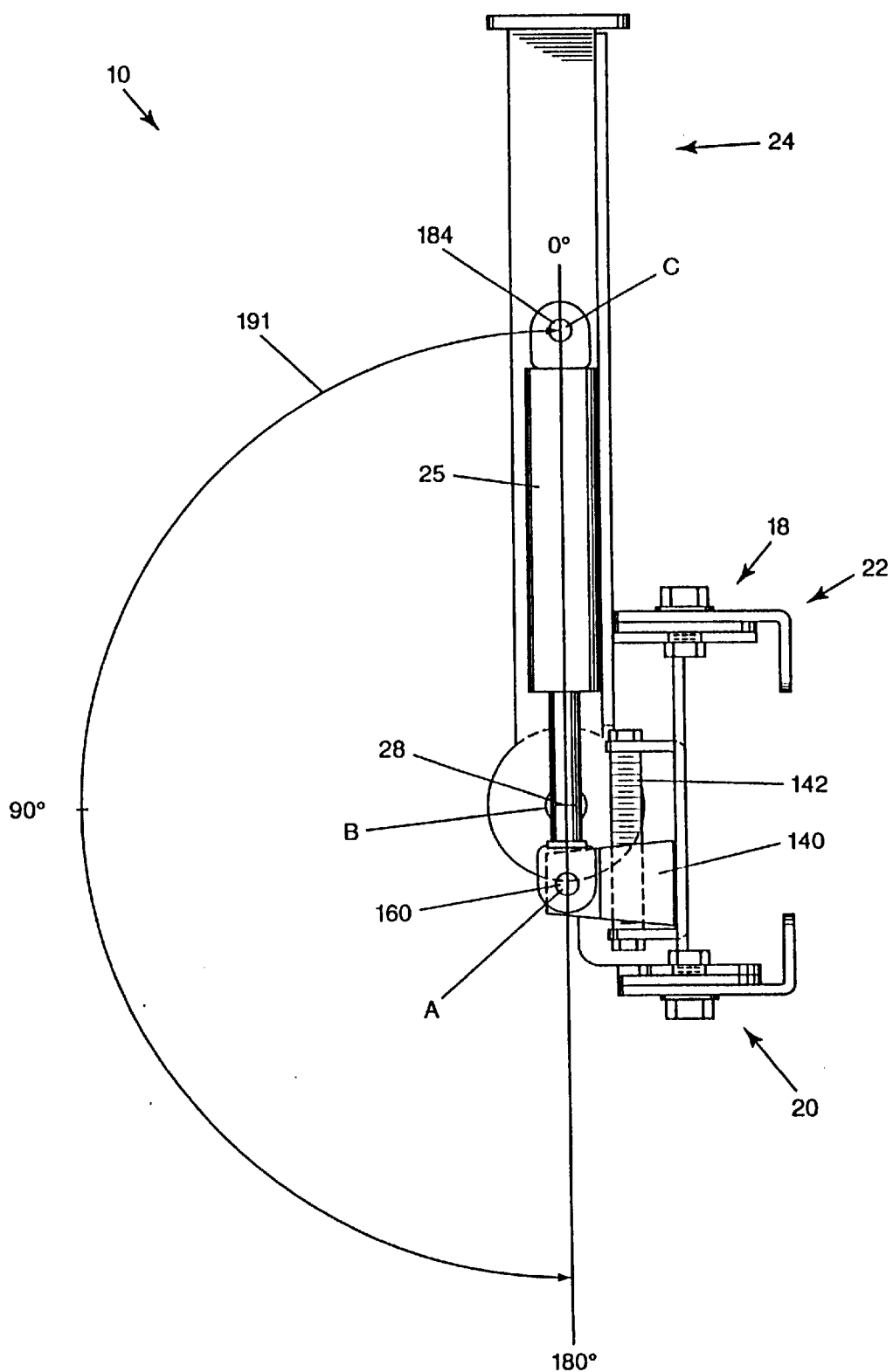
FIG. 10 illustrates a partial cutaway view of a flat panel display arm.

FIGS. 8–10 are illustrative examples in partial cutaway of various positionings of the flat panel display arm 24 about horizontal axis 28 shown in FIG. 1. The three axis pivot 30 and the flat panel display 16 are not illustrated for purposes of brevity and clarity. In these particular examples the gas spring mount 140 is adjusted to the maximum load position, thus providing the greatest offset from pivot axis 28, providing the greatest gas spring assistance. As adjustable gas spring mount 140 is adjusted closer to the horizontal axis 28, the counterbalance pivot point is lessened, which is desireable with smaller, lighter loads. Infinite adjustability within a range of payloads is desireable and attainable with this design. Also illustrated is the ability of the support arm 24 to travel from +90° (vertical up position) to −90° (vertical down position).

It should be noted that for each and every various monitor weight, there is an optimum counterbalance force pivot point for the adjuster 140. And, even further, it should be noted that at each adjustment point (weight of monitor), the arm will, by design, dynamically adjust the counterbalance moment as the arm is moved through the 180° range of travel.

The load moment increases as the arm travels from 0° to 90°, reaching its maximum at 90°. It then decreases as the arm is moved from 90° to 180°. The load moment is at its minimum (zero) when the arm is vertical, 0° or 180°.

The counterbalance moment increases and decreases to essentially cancel the load moment as the arm 24 travels from 0° to 90° to 180°. The dynamic aspect of the counterbalance is created by the relationship of the three pivot points in the system. Point B is the pivot of the arm 24 through the horizontal axis 28. Point A is the gas spring pivot bolt 160 on the arm pivot support bracket 22. Point C is the gas spring pivot 184 away from the arm pivot. At 0° and 180° the three pivot Points B, A and C are all in line, thus providing zero counterbalance moment. As the arm pivots about "B", the angle A-C-B increases to its maximum at 90° and then decreases back to zero at 180°. This dynamic angle exactly corresponds with the load moment. The angle created about these pivot points puts the gas spring in the correct position to counterbalance the load moment for each position of the arm.

Figure 11:
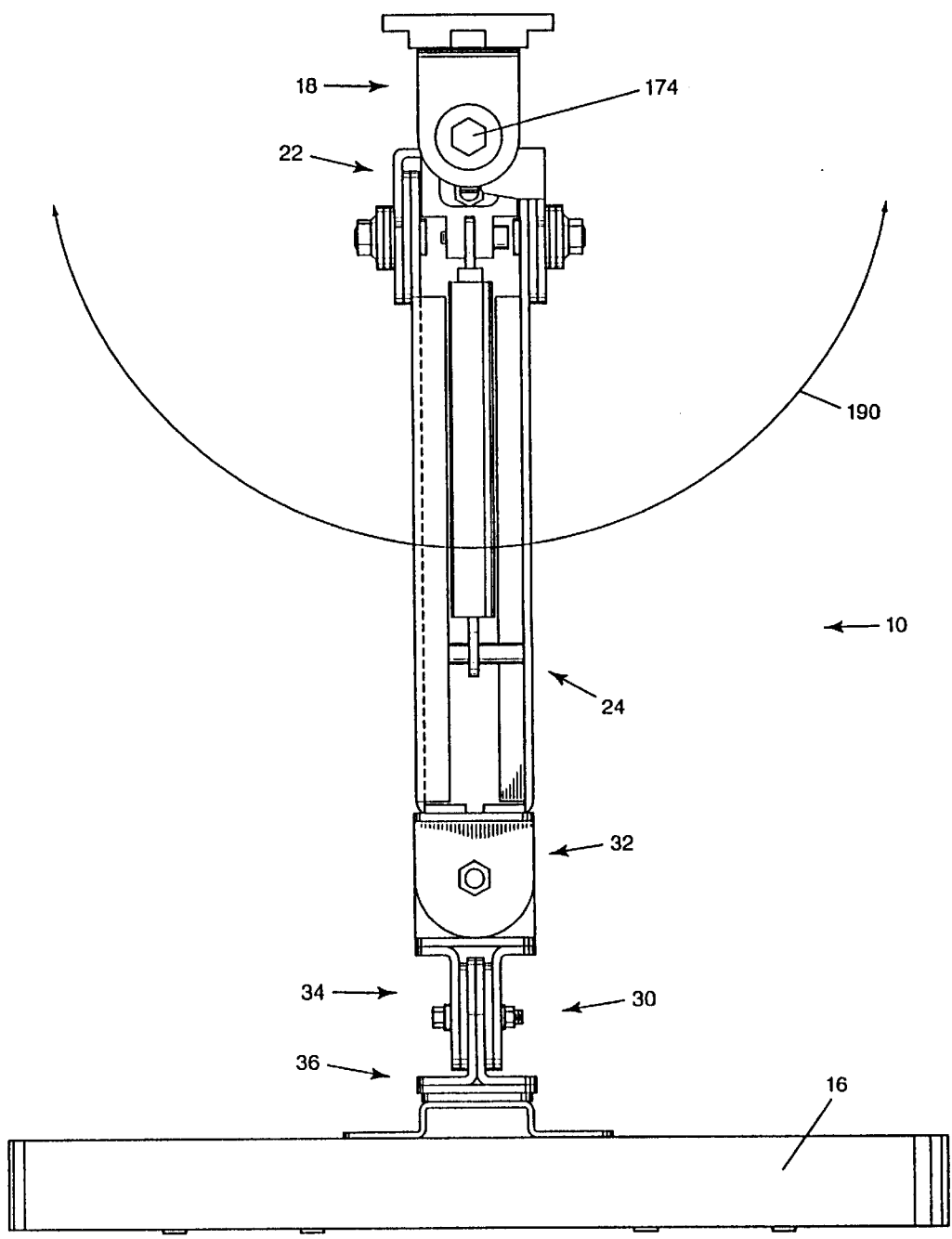
FIG. 11 illustrates a top view of the pivot range of a support arm about a vertical axis.

FIG. 11 illustrates a top view of the pivot arc 190 of the support arm 24 about vertical axis 26, as shown in FIG. 1, where bolt 174 secures angled bracket assembly 18 to the pivot support bracket 22. The pivot range arc 190 is capable of ±90° range, or greater, depending on the mounting configuration. The limit would normally be set by the width of the flat panel display 16 when it contacts the wall, plate, machine or other such surface, prior to the 90° pivot. Pivot assembly 32 allows the flat panel display 16 to be pivoted about vertical axis 40, shown in FIG. 2, allowing the flat panel display 16 to be positioned parallel to the wall, plate, machine or other such surface.

Figure 12:
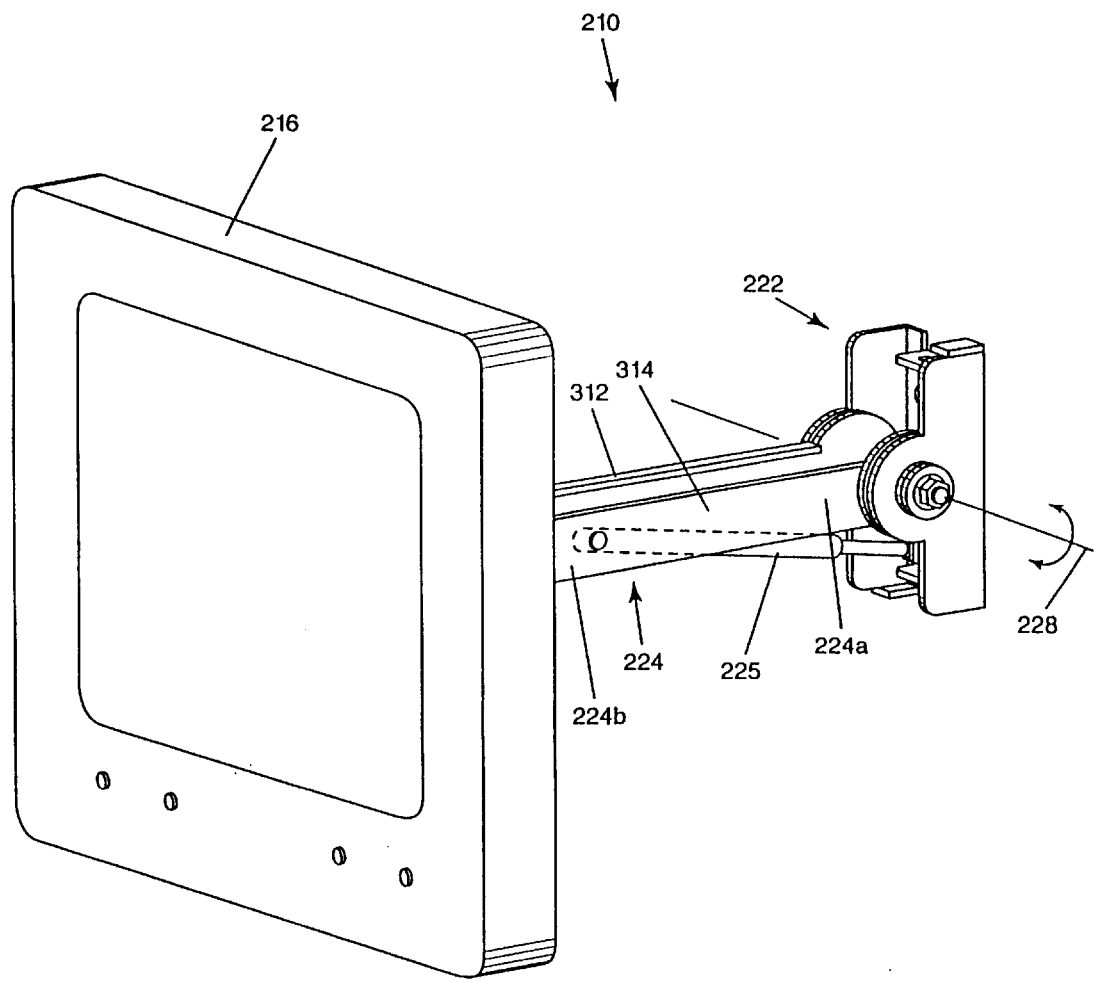
FIG. 12 a first alternative embodiment, illustrates a perspective view a flat panel display arm.
Figure 13:
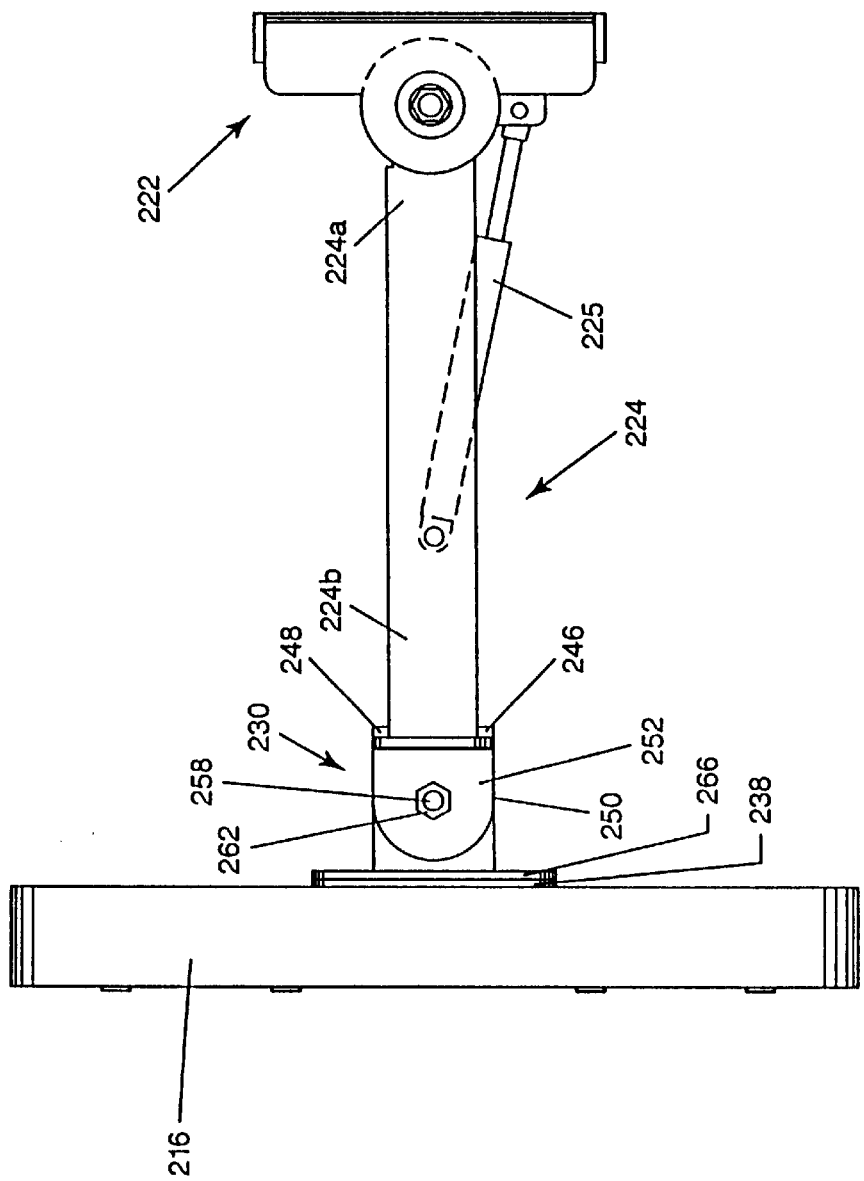
FIG. 13 illustrates a side view of the elements of FIG. 12.

FIG. 12 illustrates a perspective view of flat panel display arm 210, the first alternative embodiment, suitably secured directly to a wall beam or other suitable surface and supporting a flat panel display 216. Pivotal support bracket 222 serves as a pivotal mount support for arm 224 and other associated components including a gas spring 225. Gas spring 225 secures between the pivotal support bracket 222 and the support arm 224 as later described in detail. Support arm 224 pivotally secures to the pivotal support bracket 222 to offer movement of the support arm 224, the single axis pivot 230, as shown in FIG. 13, and the flat panel display 216 as a unit about the horizontal axis 228. Alternately, the three axis pivot 30, such as previously described in detail, can be secured at the outboard end 224b of the support arm 224 to support the flat panel display 216.

FIG. 13 illustrates a side view of the elements of FIG. 12, where all numerals correspond to those elements previously described. Illustrated in particular is the single axis pivot 230 suitably secured between the outboard end 224b of support arm 224 and a bracket 238 on the rear surface of the flat panel display 216. The inboard end 224a of the support arm 224 is pivotally secured to the pivotal support bracket 222 to provide elevational pivotal positioning of the support arm 224 and its flat panel display 216 payload about the horizontal axis 228 illustrated in FIG. 12. The single axis pivot 230 and the flat panel display 216 can be elevationally positioned about the horizontal axis 228 in conjunction with and by the action of the pivoted support arm 224. As viewed in FIG. 13, the single axis pivot 230 offers rotation of the flat panel display 216, about the horizontal axis 240, as shown in FIG. 15, extending through the single axis pivot 230.

The single axis pivot 230 secures to vertically oriented flanges 246 and 248 extending from members of the support arm 224.

Figure 15:
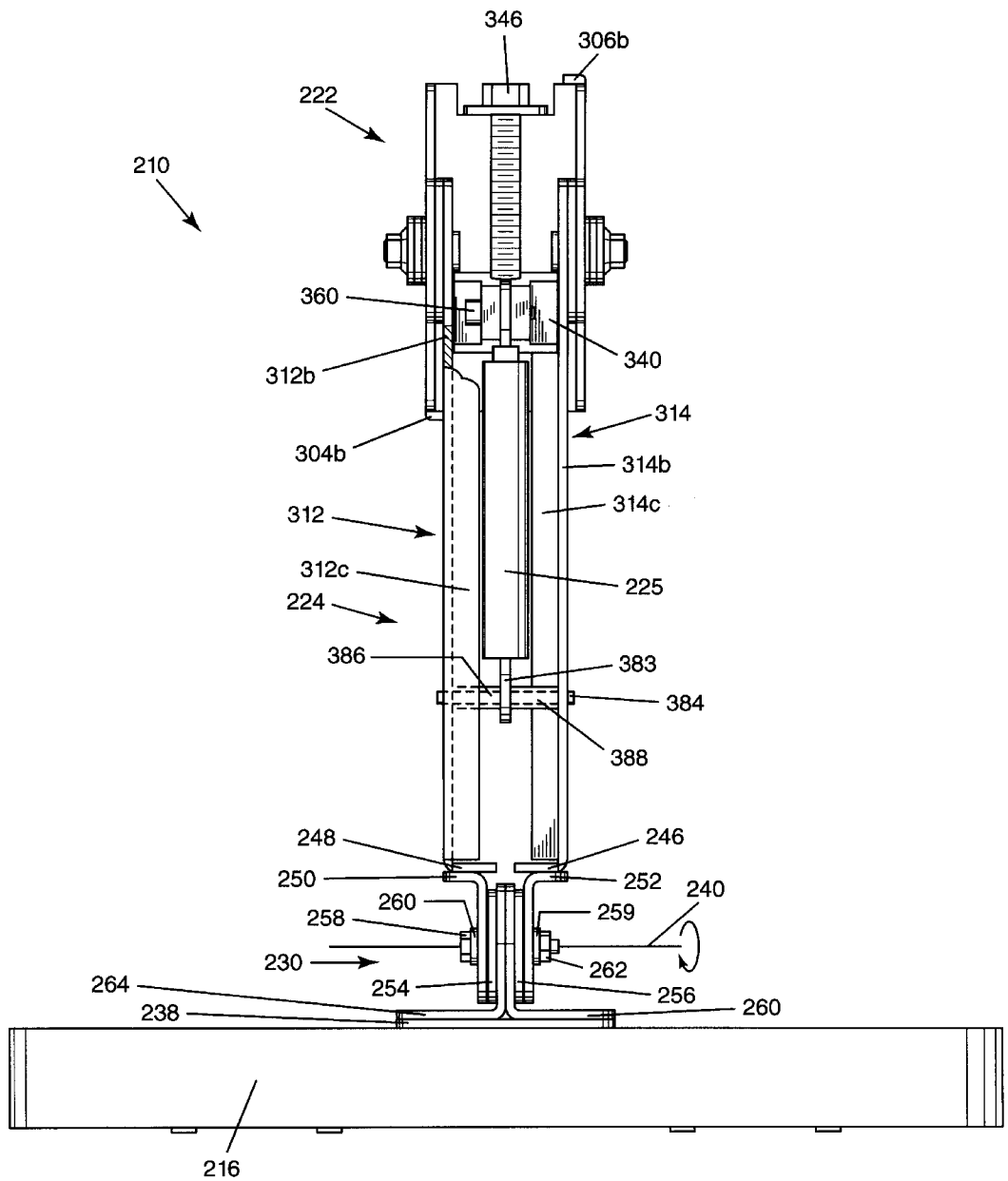
FIG. 15 illustrates a front view of a flat panel display arm in the known position.

Now, with reference to FIGS. 13 and 15 the single axis pivot 230 is further described. The single pivot 230 includes angle brackets 250 and 252 secured to support arm flanges 246 and 248 at outboard end 224b of the support arm 224, UHMWPE disks 254 and 256 aligned to the inner planar surfaces of angle brackets 250 and 252, respectively, and a bolt 258 having two Belleville washers 259 and 260 and nut 262. Aligned to the interior surfaces of the UHMWPE disks 254 and 256 are the vertically aligned juxtaposed portions of angle brackets 264 and 266 which extend outwardly to present flanged portions for mating to bracket 238, which mounts the flat panel display 216 to the single axis pivot 230. Bolt 258 extends through the brackets 250, 252, 264 and 266, UHMWPE disks 254 and 256, and Belleville washers 259 and 260, and nut 262. Bolt 258 is tensioned across the assembly to provide suitable friction to support the flat panel display weight at all positions as it is tilted about horizontal axis 240, of FIG. 15, and moved vertically about horizontal axis 228, of FIG. 12, with support arm 224.

Figure 14:
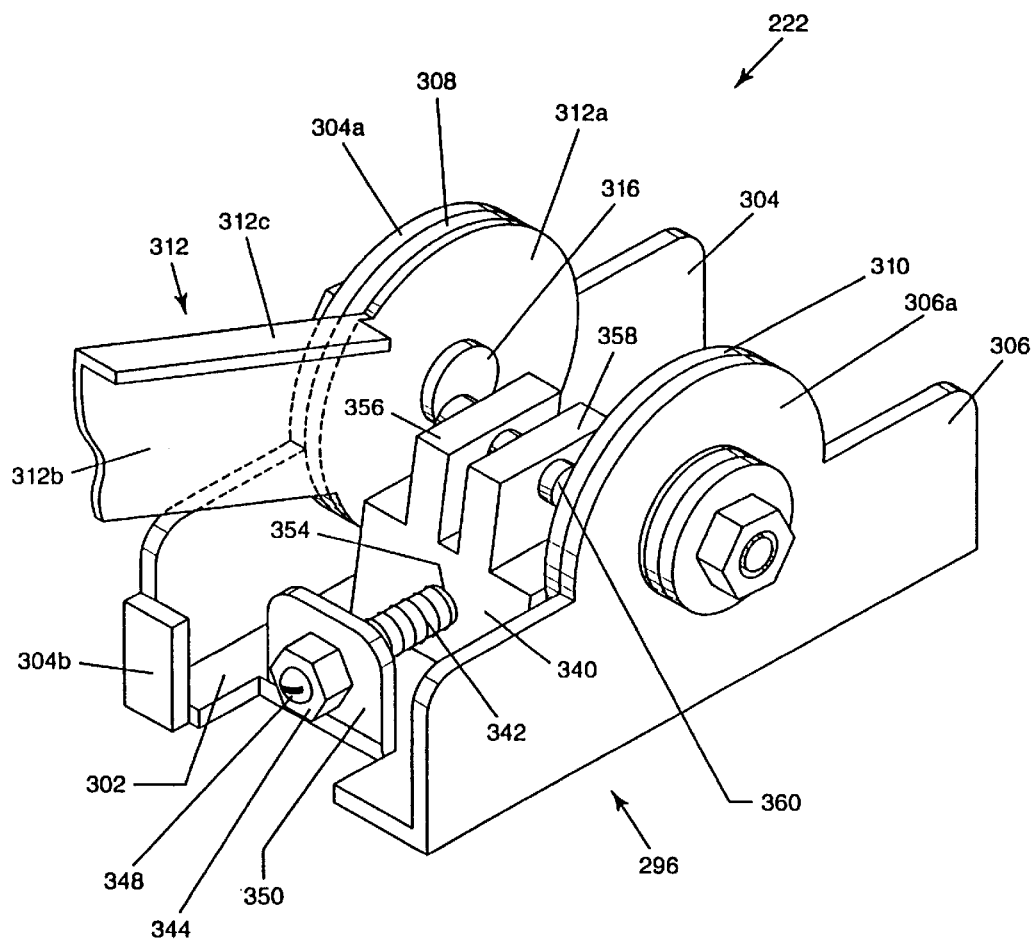
FIG. 14 illustrates a rotated isometric view of a pivotal support bracket.
Figure 16:
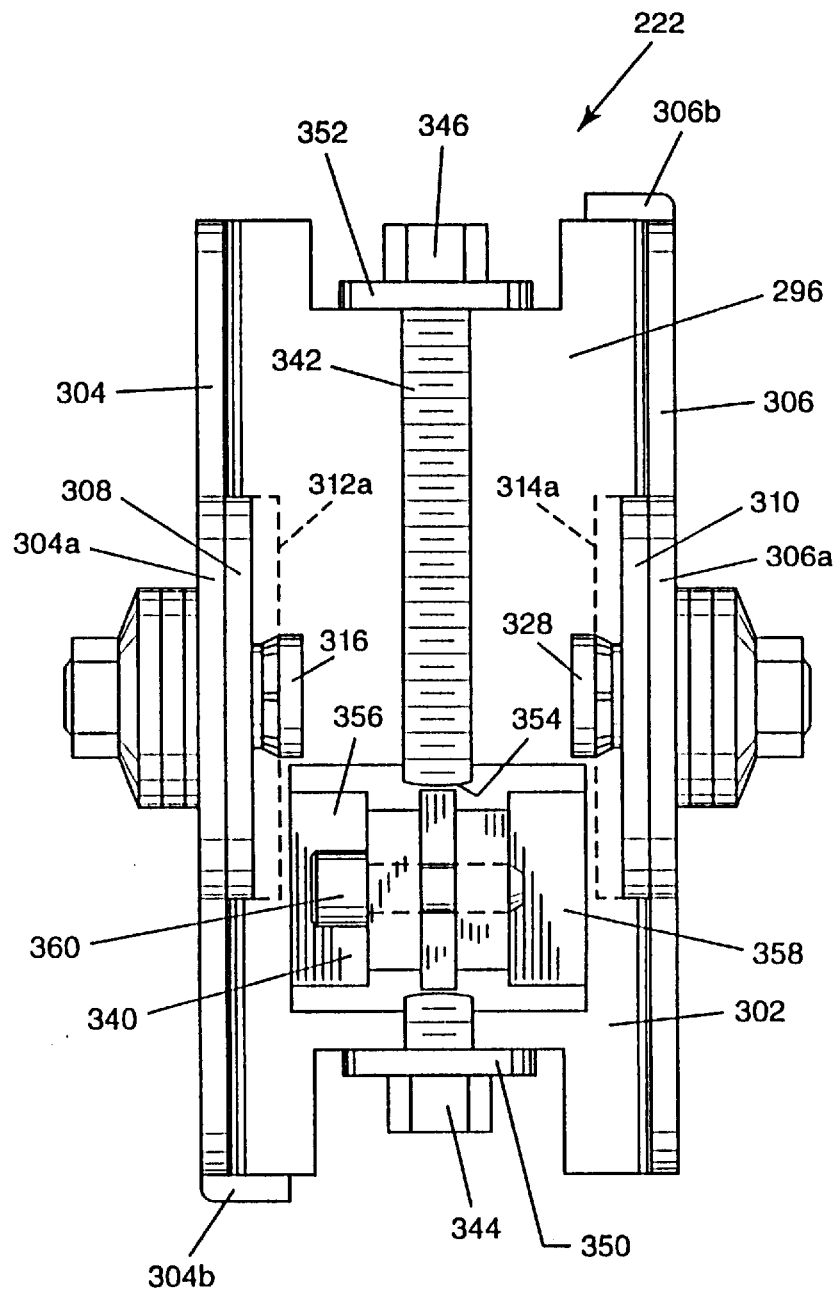
FIG. 16 illustrates a front view of a pivotal support bracket.
Figure 17:
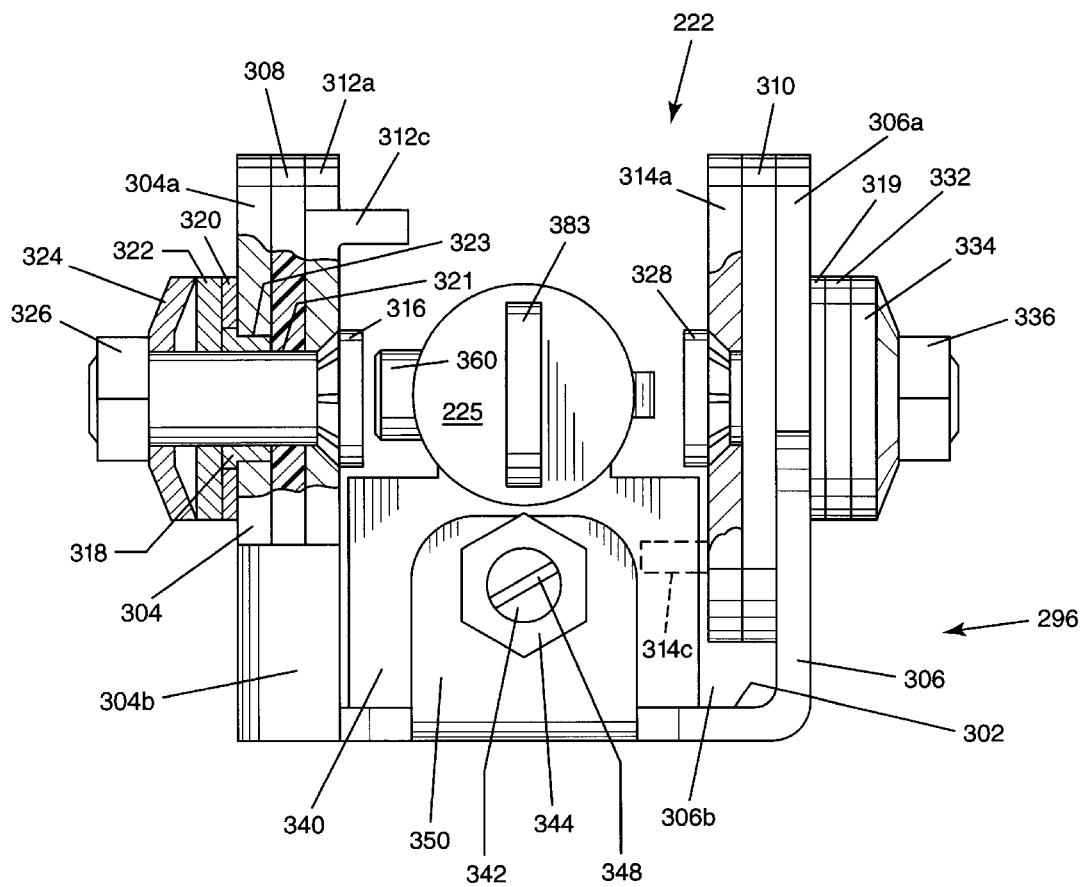
FIG. 17 illustrates a bottom view in partial cross section of a pivotal support bracket.

FIG. 14 illustrates a rotated isometric view of the pivotal support bracket 222, FIG. 16 illustrates a front view of the pivotal support bracket 222, and FIG. 17 illustrates a bottom view in partial cross section of the pivotal support bracket 222, where all numerals correspond to those elements previously described. With reference to FIGS. 14, 16 and 17, the pivotal support bracket 222 in now described. The pivotal support bracket 222 includes a central bracket 296 having a planar area 302 and planar members 304 and 306 extending at right angles therefrom. Extending further from the planar members 304 and 306 are contiguous semicircular members 304a and 306a, respectively, which align to UHMWPE disks 308 and 310 in concert with planar areas 304 and 306. Support arm member 224, illustrated in FIG. 12, includes a left member 312 and a right member 314. Referring to FIG. 14, left support arm member 312 includes a disk-like portion 312a corresponding to the size of the UHMWPE disk 308. A planar member 312b, having an angled support member 312c, extends from the disk-like portion 312a to form part of the support arm 224. Right member 314 is not shown in FIG. 13 for purposes of brevity and clarity. Angled support members 312c and 314c of FIG. 15, also act as stops on bracket tabs 304b and 306b, stopping the support arm 224 at a ±90° rotation. FIG. 16 illustrates disk-like portion 312a and 314a of left and right support members 312 and 314 in dashed lines. FIG. 17 illustrates the left member and right members 312 and 314 in the down position but shows a full disk-like portion 312a, (no cross section), and a cutaway view of the disk-like portion 314a for purposes of brevity and clarity. A captive stud 316 secures in the disk-like portion 312a of the left support arm member 312 and extends through an oilite bearing 318 and accompanying oilite washer 320 assembly centered about and along holes 321 and 323 in the UHMWPE disk 308 and the planar member 304, respectively, through a steel washer 322, a Belleville washer 324 and a nut 326. Nut 326 is adjusted to provide tension across the assembly to provide suitable friction. In a similar fashion, a captive stud 328 secures in the disk-like portion 314a of the right support arm member 314 and extends through an oilite bearing similar to oilite bearing 318 (not shown) and accompanying oilite washer 319 centered about and along holes in the UHMWPE disk 310 and the planar member 306, through a steel washer 332, a Belleville washer 334 and a nut 336.

A positionable and adjustable gas spring mount 340 is adjustably mounted to adjustably slide along the central planar area 302 as positioned by a threaded shaft 342 having affixed nuts 344 and 346 at opposing ends. A slot 348 at the lower end of the threaded shaft 342 provides for rotational adjustability of the threaded shaft 342 and thus the gas spring mount 340 along the central planar area 302. The angle of planar area 302 and thus the angle of threaded adjustment shaft 342 in relation to the support arm 224 horizontal pivot axis 228 as shown in FIG. 12 is predetermined by a computerized mathematical algorithm for each mounting option or orientation and weight to provide an optimum counterbalance force pivot point throughout the arm member 224 operating range. See FIGS. 18, 19 and 23 for examples of threaded shafts 242, 424 and 642 set at different adjustment angles for each mounting option. It should be noted that positionable and adjustable gas spring mount 225 is positionable in the space between left support arm member 312 and right support arm member 314 up to and intersecting with the support arm 224 horizontal axis 228 as shown in FIG. 12, allowing the support arm 224 to rotate and counterbalance a variable payload in a range of 0° to 180°. Tabs 350 and 352 extend outwardly from the central planar area 302 to support the ends of the threaded shaft 342 by means of holes located in the tabs 350 and 352 through which the threaded shaft 342 passes. A threaded hole 354 central to the gas spring mount 340 accommodates the threaded shaft 342 for purposes of adjustment of the gas spring mount 340. Gas spring mount 340 also includes opposed tabs 356 and 358. A pivot bolt 360 passes through the opposed tabs 356 and 358 to serve as a mount for one end of the gas spring 225. The outboard end 383 of the gas spring 225 secures to a pivot pin 384 passing through left and right support arm members 312 and 314 as illustrated in FIG. 15.

The load counterbalance mechanism which provides a dynamically increasing counterbalance moment which corresponds to the increasing moment load on the arm as the arm transverses from 0° vertical to 90° horizontal and which dynamically decreases as the arm moves downward from 90° horizontal to 180° vertical to provide a linear counterbalance force throughout the arm's total adjustment range.

FIG. 15 illustrates a front view of the flat panel display arm 224 in the fully lowered position with attached single axis pivot 230 and flat panel display 216, where all numerals correspond to those elements previously described. Illustrated in particular is a view of the single axis pivot 230 and of the gas spring 225 secured between the gas spring mount 340 and the pivot pin 384 in the support arm 224.

FIG. 16 illustrates a front view of the pivotal support bracket 222, where all numerals correspond to those elements previously described.

FIG. 17 illustrates a bottom view in partial cross section of the pivotal support bracket 222, where all numerals correspond to those elements previously described.

Figure 18:
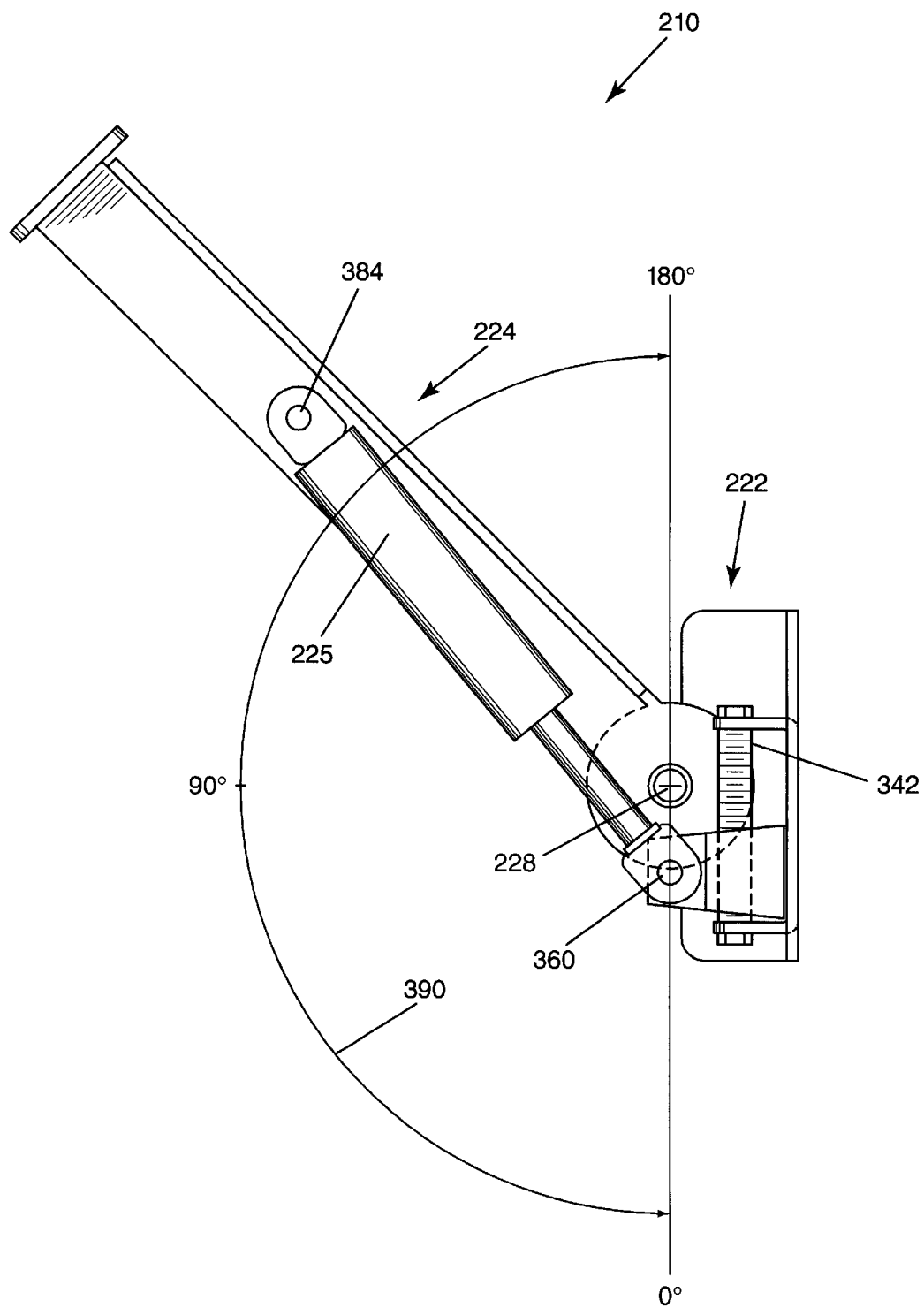
FIG. 18 illustrates a partial cutaway view of various positionings of a flat panel display arm about a horizontal axis.

FIG. 18 is an illustrative example in partial cutaway of various positionings of the flat panel display arm 224 about horizontal axis 228 shown in FIG. 12. Arc 390 further illustrates the 180° range of motion of the pivot positionings. The single axis pivot 230 and the flat panel display 216 are not illustrated for purposes of brevity and clarity.

Figure 19:
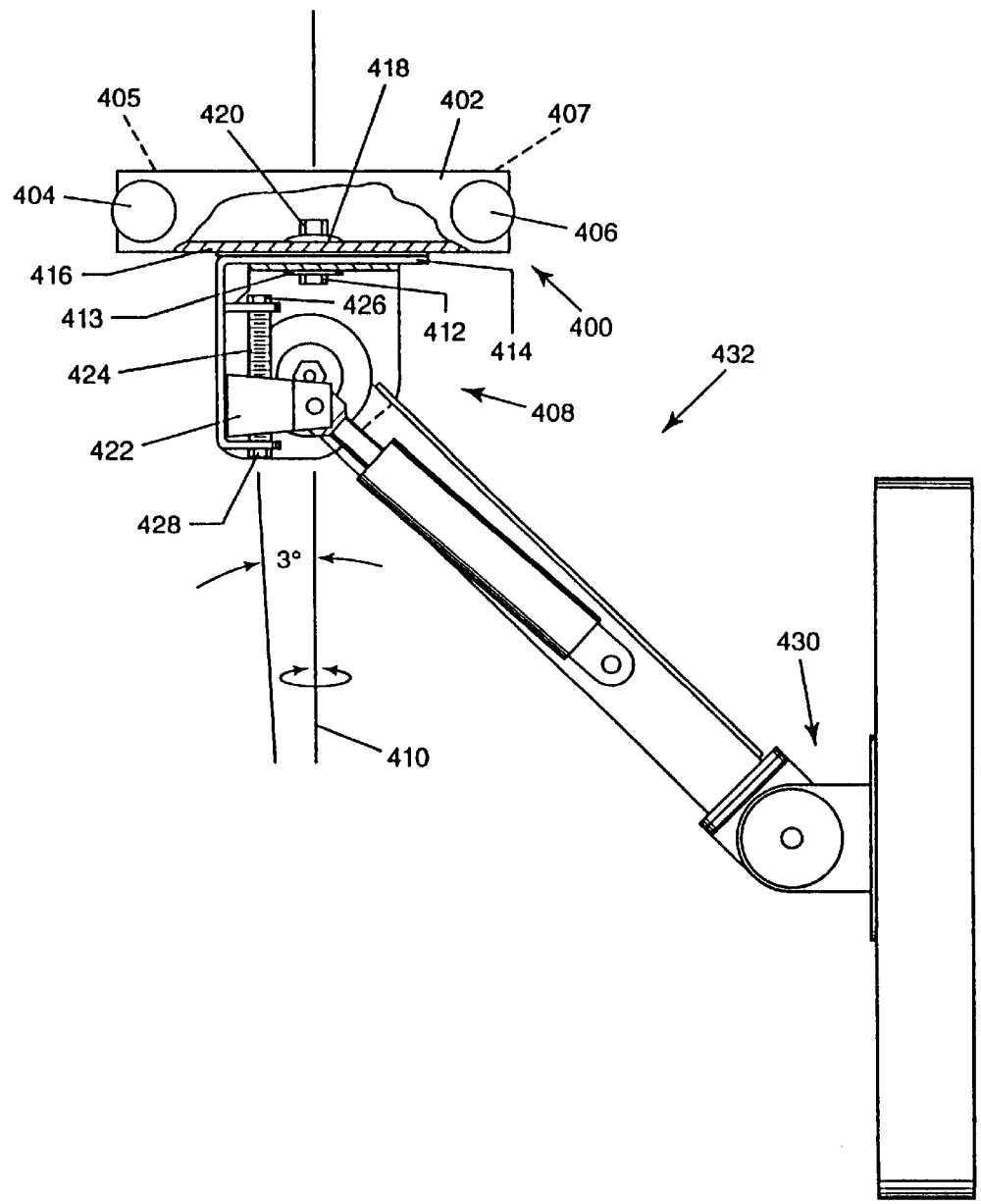
FIG. 19 a second alternative embodiment, illustrates a ceiling track mount in partial cutaway.

FIG. 19 illustrates, in partial cutaway, of ceiling track mount 400, the second alternate embodiment, where all numerals correspond to those elements previously described. The ceiling track mount 400 is comprised of a support bracket 402 and four track wheels 404, 405, 406 and 407, a flat panel display arm 432, and a single axis pivot 430 incorporating a pivot support bracket 408 constructed according to the same principles of pivot support bracket 222 illustrated in FIG. 14. Flat panel display arm 432 and the single axis pivot 430 are constructed identical to the flat panel display arm 224 and single axis pivot 230, respectively, illustrated in FIG. 15. The pivot support bracket 408 rotates around vertical axis 410 providing an infinitesimal number of azimuthal positionings. The ceiling track mount 400 is designed according to the same principles taught in the preferred embodiment having a pivot support bracket 408, bolt 412, Belleville washers 413 and 418, steel washer 414, UHMWPE disk 416, nuts 420, 426 and 428, an adjustable gas spring mount 422, and threaded shaft 424. Threaded shaft 424 is at a 3° offset to the vertical axis 410, as predetermined by a computerized mathematical algorithm for each mounting option.

Track wheels 404, 405, 406 and 407 are captured by a ceiling mounted track (not shown) which allows the ceiling track mount 400 and flat panel display arm 432 to be easily rolled to any location along the ceiling mounted track. In the alternative, eliminating the track provides the option of incorporation of a fixed, rotational overhead mount.

Figure 20:
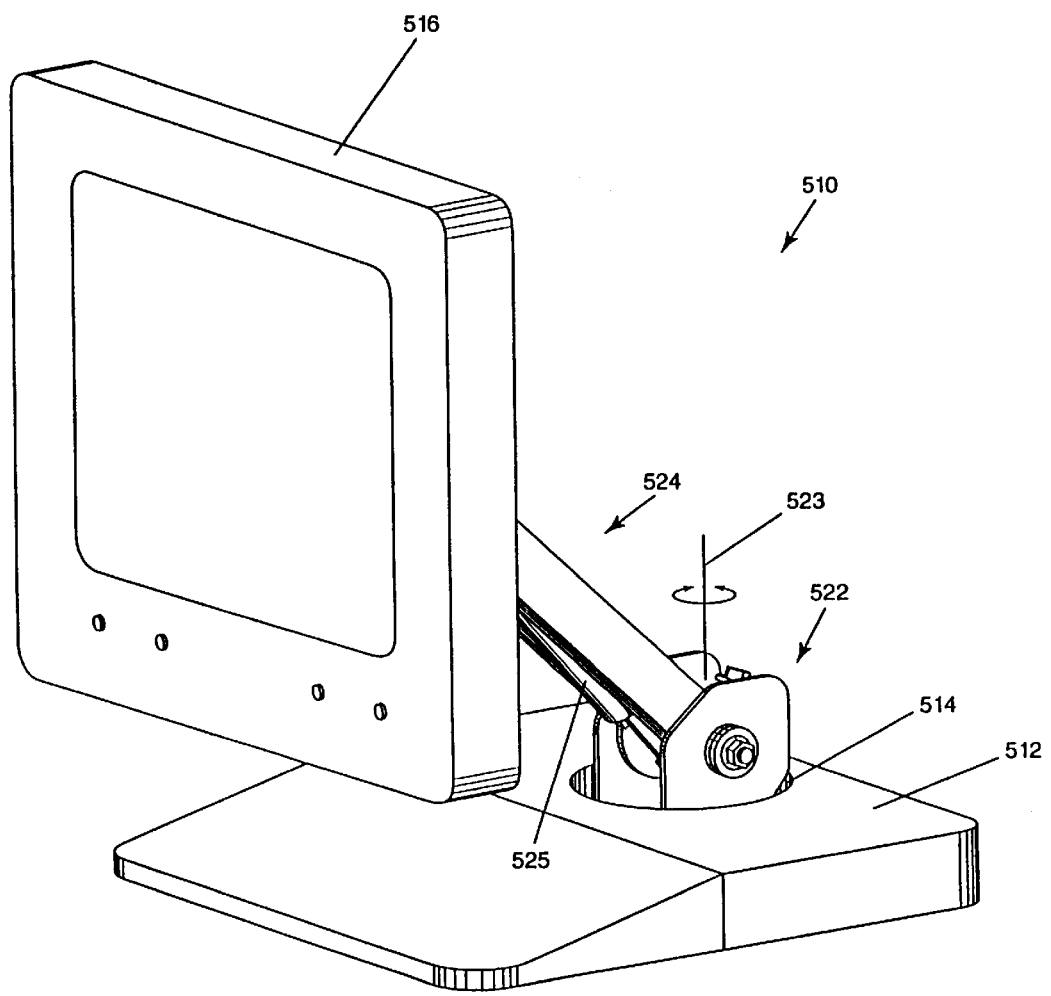
FIG. 20 a third alternative embodiment, illustrates a view of a tabletop flat panel display arm.
Figure 21:
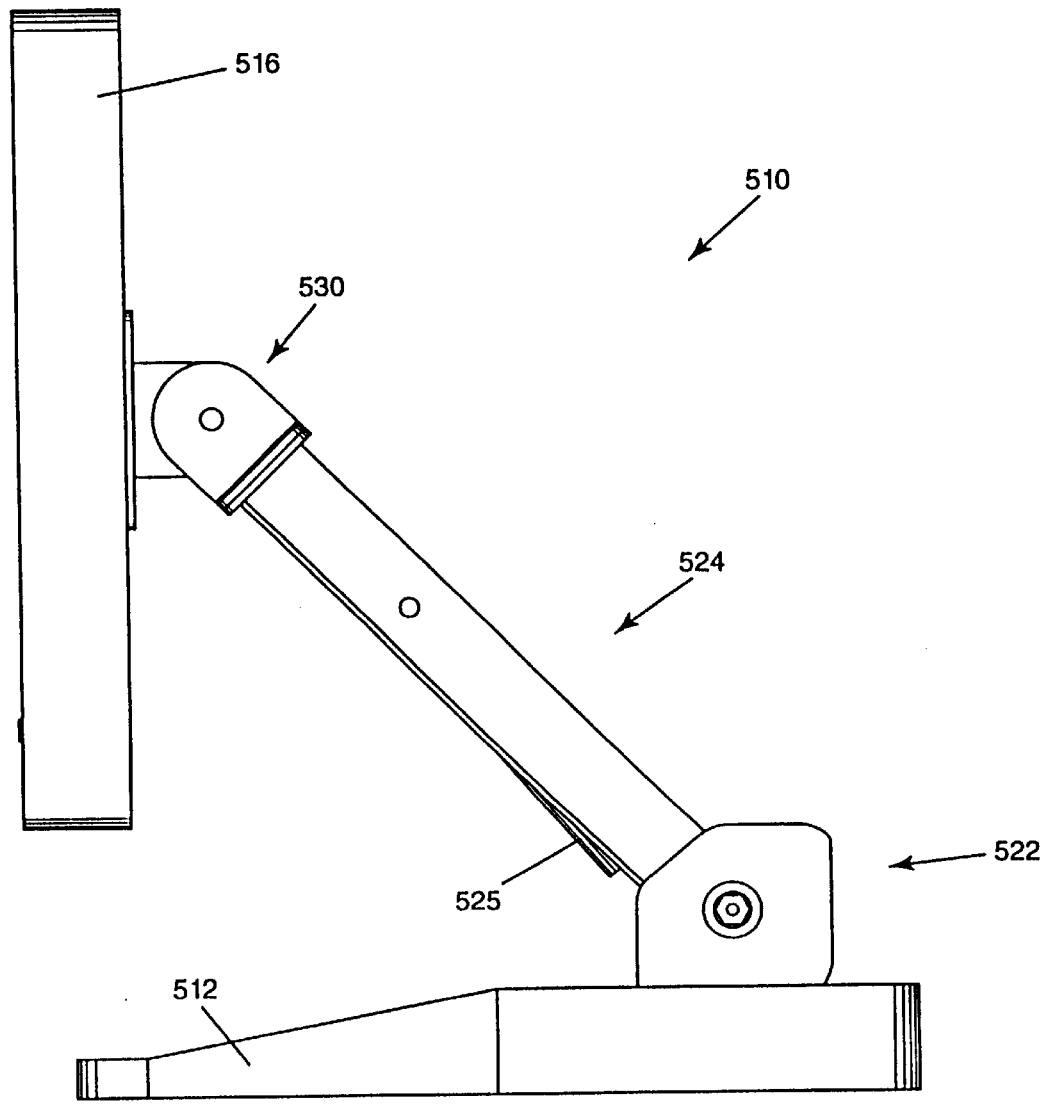
FIG. 21 illustrates a view of a tabletop flat panel display arm.

FIGS. 20–21 illustrate two views of the tabletop flat panel display 510, the third alternative embodiment of the present invention. The tabletop flat panel display 510 is comprised of an angled base 512 with a recessed hole 514, a pivot support bracket assembly 522, a support arm 524 having a gas spring 525, and a flat panel display 516. The pivot support bracket assembly 522 is designed and constructed according to the same principles taught in the preferred embodiment and rotates about vertical axis 410 providing azimuthal rotation of the support arm 524 and the flat panel display 516. The single axis pivot 530 connects the support arm 524 to the flat panel display 516, which is designed and constructed according to the concept of the single axis pivot 230 described in FIG. 15.

Figure 22:
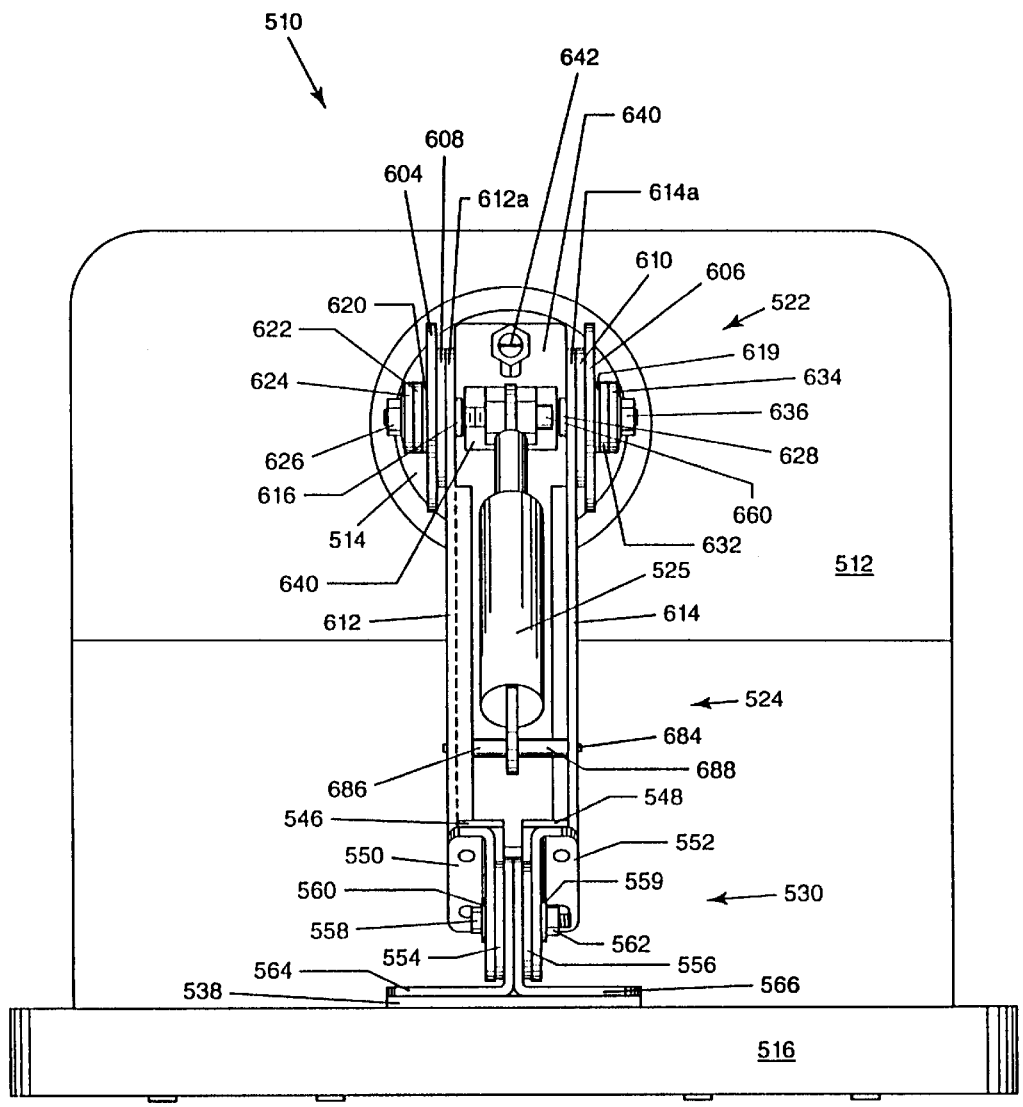
FIG. 22 illustrates a top view of a tabletop flat panel display arm.

FIG. 22 illustrates a top view of the tabletop flat panel display 510, where all numerals correspond to those elements previously described. Specifically, the pivot support bracket assembly 522, the support arm 524, and the single axis pivot 530 will now be described in detail.

The pivot support bracket assembly 522, designed and constructed using the same principles taught in the preferred embodiment, is comprised of nuts 626 and 636, Belleville washers 624 and 634, steel washers 622 and 632, 619 and 620 oilite washers 619 and 620, bracket planar members 604 and 606, UHMWPE disks 608 and 610, left and right support arm members 612 and 614, respectively, with disk-like portions 612a and 614a, respectively, captive studs 616 and 628, an adjustable gas spring mount 640, and a pivot bolt 660.

The support arm 524 is comprised of a left bracket member 612, designed and constructed using the same principles taught in the preferred embodiment, a right bracket member 614, a gas spring 525, plastic spacers 686 and 688, a pivot pin 684, and flanges 546 and 548.

The single axis pivot 530, designed and constructed using the same principles taught in the first alternative embodiment, is comprised of angle brackets 550, 552, 564 and 566, UHMWPE disks 554 and 556, Belleville washers 559 and 560, bracket 538, and bolt 558 and nut 562.

Figure 23:
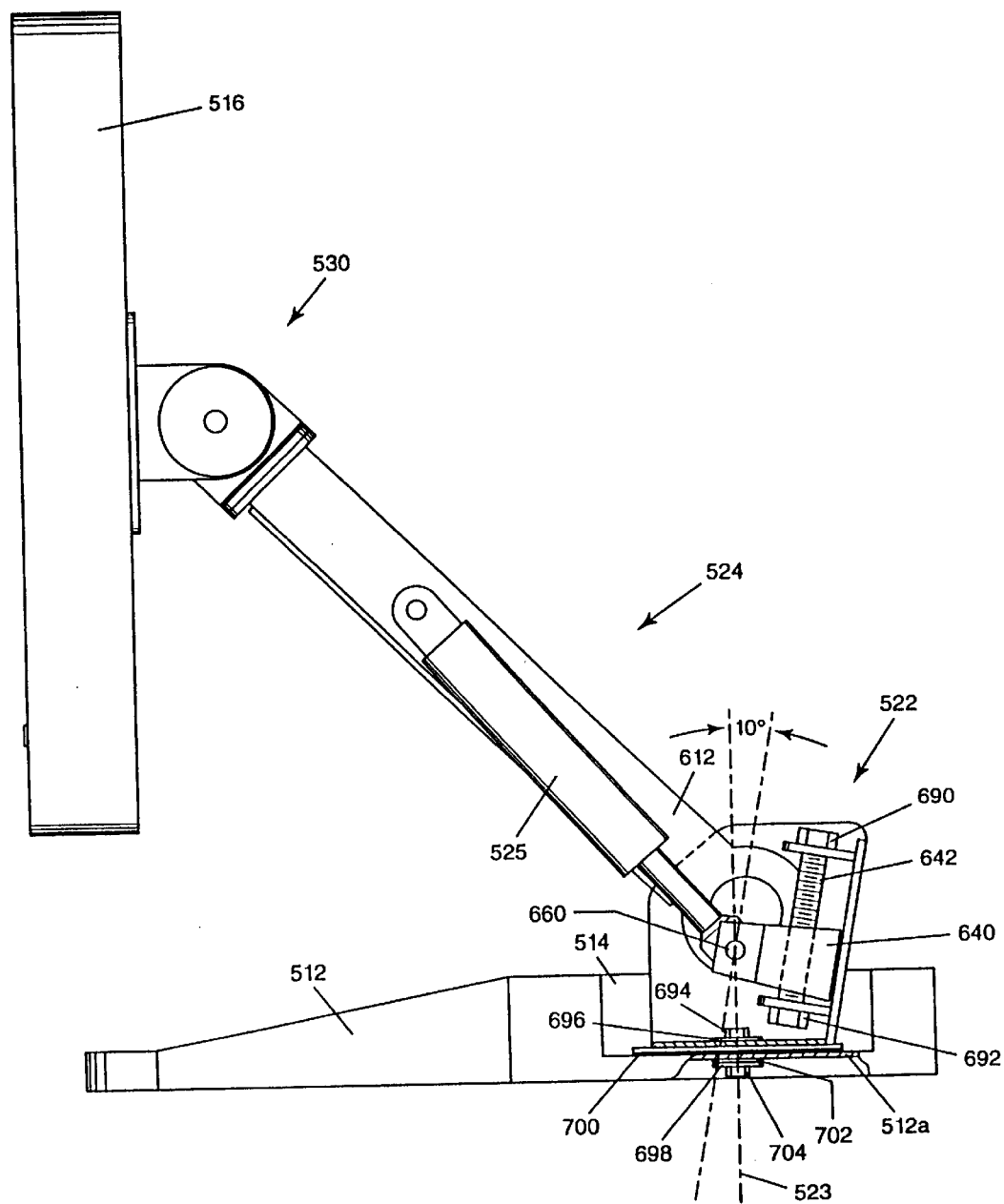
FIG. 23 illustrates a cross sectional view of a table top flat panel display arm in partial cutaway.

FIG. 23 illustrates a cross sectional view in partial cutaway of the third alternative embodiment, where all numerals correspond to those elements previously described. The pivot support bracket assembly 522, which rotates about its vertical axis 523, is now described in detail, specifically the mounting of the pivot support bracket 522 to the angled base 512. The pivot support bracket 522 is secured to angled base 512 in the recessed hole 514 where bolt 694 passes downwardly through Belleville washer 696, pivot support bracket 522, UHMWPE disk 700, planar member 512a of angled base 512, steel washer 698, Belleville washer 702 and is frictionally secured via nut 704. Similarly, removal of the angled base 512 allows the flat panel display mounting system to be mounted in a pivotal application to a table, desk or countertop, or other mounting surface. Adjustment bolt is offset 10° to the vertical axis 523, as predetermined by a computerized mathematical algorithm for each mounting option.

Figure 24:
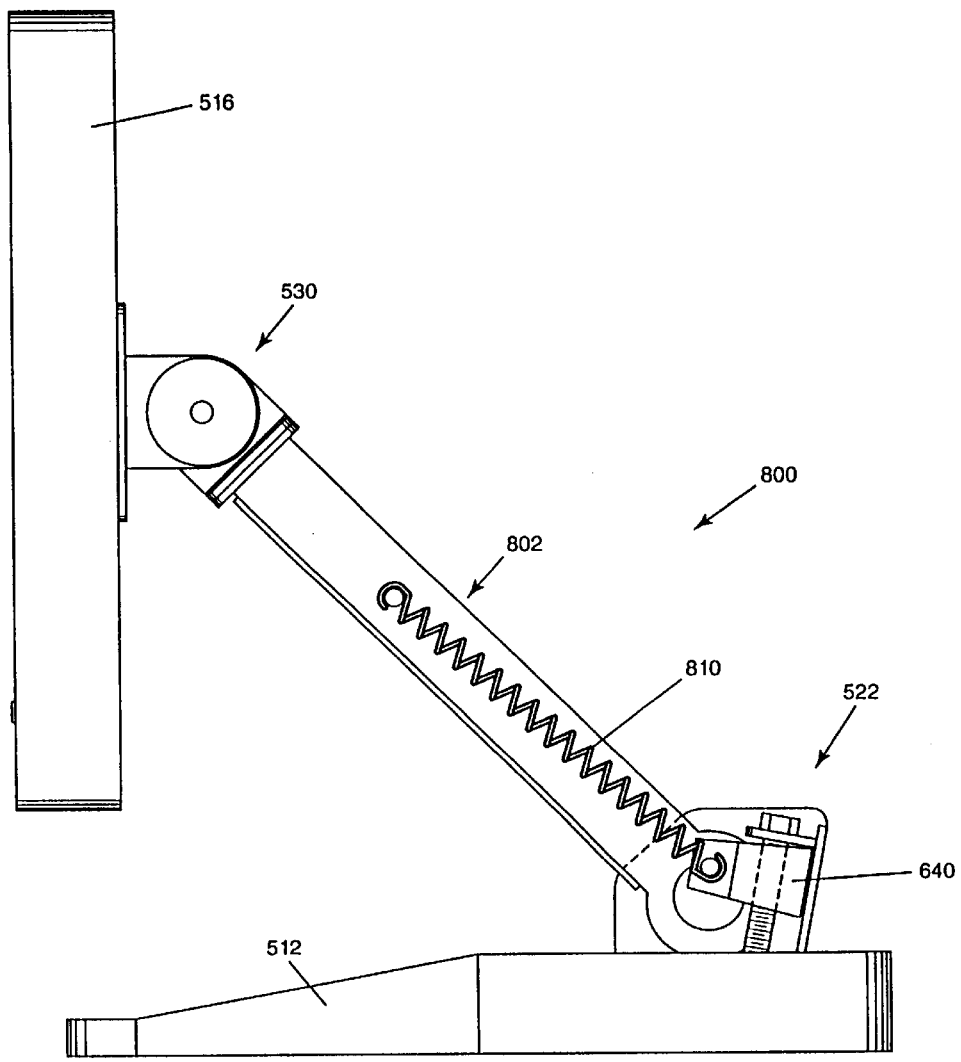
FIG. 24 a fourth alternative embodiment, illustrates a cross sectional view in partial cutaway of a tabletop flat panel display arm with a steel coil spring.

FIG. 24, a fourth alternative embodiment, illustrates a cross sectional view, in partial cutaway, of a tabletop flat panel display 800 similar in construction and concept to the tabletop flat panel display illustrated in FIGS. 20–23 and incorporating a support arm 802 having a steel coil spring 810, where all numerals correspond to those elements previously described. The tabletop flat panel display 800, with a steel coil spring 810, is designed and constructed using the same principles taught in the previous embodiments, with the substitution of a steel spring 810, and provides a pulling counterbalance force in lieu of the lifting force provided by gas spring 525, shown in FIG. 23. Since the steel coil spring is providing a pulling force, the positionable and adjustable gas spring mount 640 is mounted above the support arm 524 horizontal pivot axis, such as axis 28 as shown in FIG. 1, instead of below. The support arm 802 with a steel coil spring 810 is mounted to angled base 512 in the same fashion using the same hardware as shown and described in FIG. 23.

Figure 25:
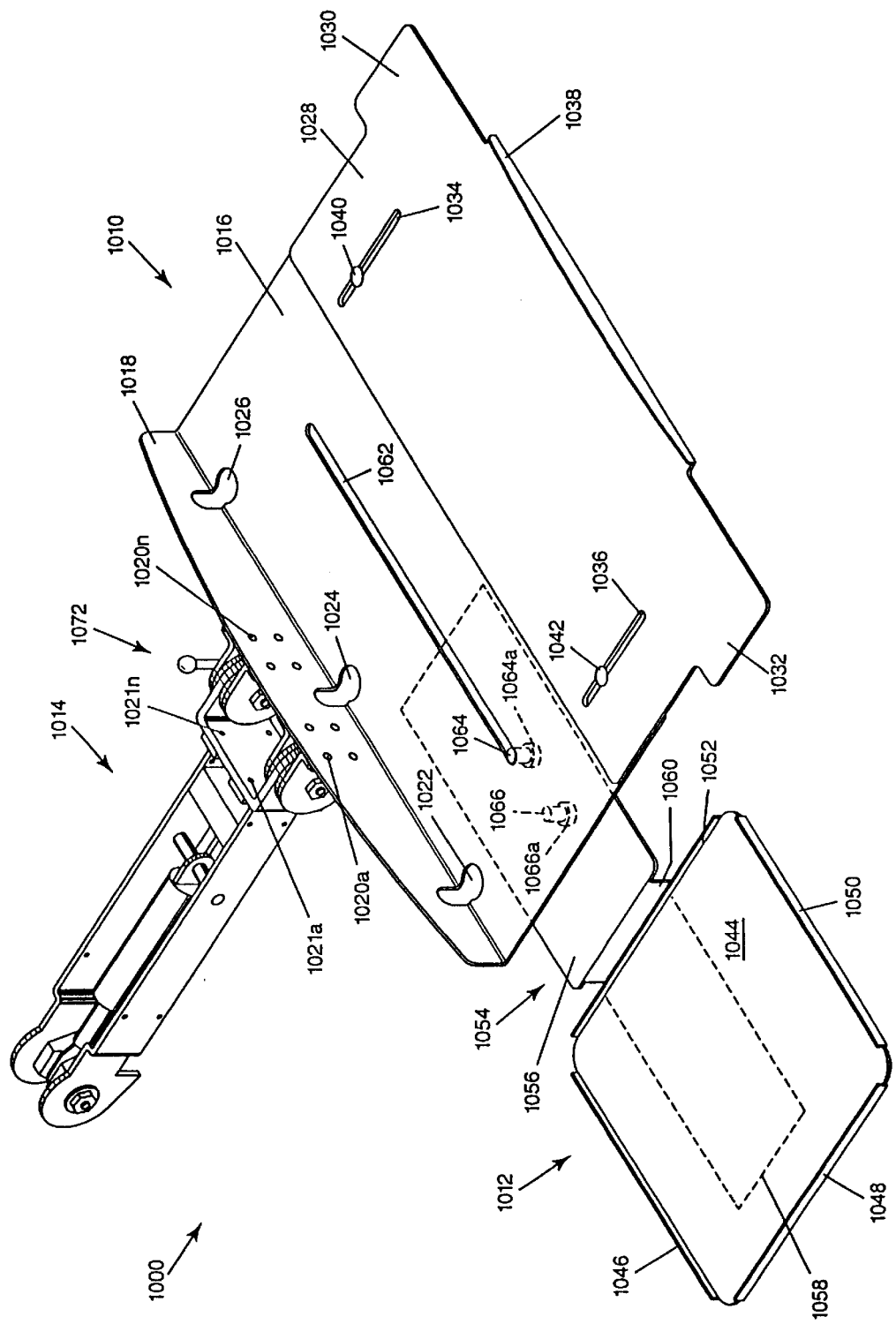
FIG. 25 a fifth alternative embodiment, illustrates a perspective view of the keyboard support system.

FIG. 25 illustrates a perspective view of a keyboard support system 1000, the fifth alternative embodiment, where all numerals correspond to those elements previously described. The keyboard support system 1000 consists of a keyboard tray 1010, a mouse pad tray 1012, a pivot/brake assembly 1072 and a support arm 1014. The keyboard tray 1010 includes a fixed portion 1016 with mounting lip 1018 which extends perpendicular to the fixed portion 1016. Cable access holes 1022, 1024 and 1026 are located at the junction of the fixed portion 1016 and the mounting lip 1018. The mounting lip 1018 also has a plurality of mounting holes 1020*a*–1020*n* for securing the keyboard tray 1010 to the pivot/brake assembly 1072 and connected support arm 1014. Support arm 1014 is designed and constructed similar to support arm 224 of FIG. 15. The pivot/brake assembly 1072 attaches to support arm 1014 with a plurality of screw and nut combination 1021*a*–1021*n*. The keyboard tray 1010 also includes a slide plate 1028 having a right extended member 1030, a left extended member 1032, slotted holes 1034 and 1036, machine screws 1040 and 1042 and a front lip 1038. The right and left extended members 1030 and 1032 accommodate various lengths of keyboard wrist rests. The slide plate 1028 slidingly secures to the fixed portion 1016 via slotted holes 1034 and 1036 where machine screws 1040 and 1042 frictionally secure mutually thereto. Mounting lip 1018 and lip 1038, when properly adjusted, capture and secure the keyboard and keyboard wrist rest to the keyboard tray 1010.

The mouse pad tray 1012 consists of a contiguous slide plate 1054 having an upper planar member 1056 and a lower planar member 1058, which are vertically offset and joined by an intermediate portion 1060. Mouse pad tray 1012 having a planar surface 1044, lips 1046, 1048, 1050 and 1052, secures to the lower planar member 1058 of the contiguous slide plate 1054 via hook and loop material, double sided tape or like materials. The upper planar member 1056 slidingly engages channels 1068 and 1070, shown in FIG. 28, where a machine screw 1064, having a knob 1064*a*, extends through a threaded hole in contiguous slide plate 1054 and upward into slotted hole 1062. Machine screw 1066, having a knob 1066*a*, extends through a threaded hole in the contiguous slide plate 1054 to lock or stop all movement of the mouse tray 1012. Machine screw 1064 is a stop to limit lateral travel of the mouse tray 1012. The machine screw 1064 can be loosened by the knob 1064*a* to back the machine screw 1064 out of slot 1062 to allow the mouse tray 1012 to be removed and reinserted on the other side of the keyboard tray fixed portion 1016.

Figure 26:
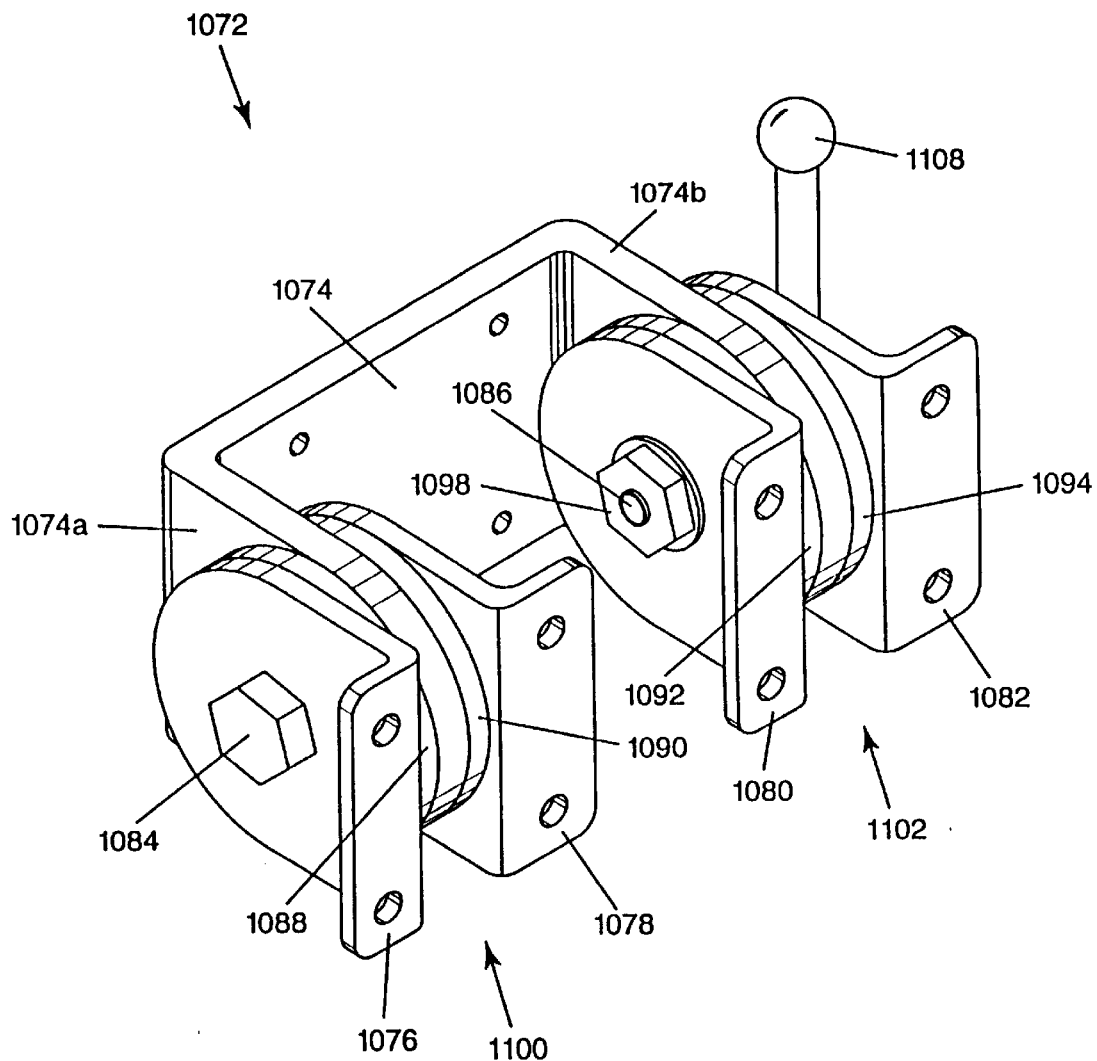
FIG. 26 illustrates a perspective view of the keyboard tray pivot brake assembly.

FIG. 26 illustrates a perspective view of the pivot/brake assembly 1072, where all numerals correspond to those elements previously described. Support arm 1014 is not shown for purposes of brevity and clarity. The pivot/brake assembly 1072 includes a U-shaped bracket 1074 with a left member 1074*a* and a right member 1074*b* which supports friction assembly 1100 and brake assembly 1102.

Figure 27:
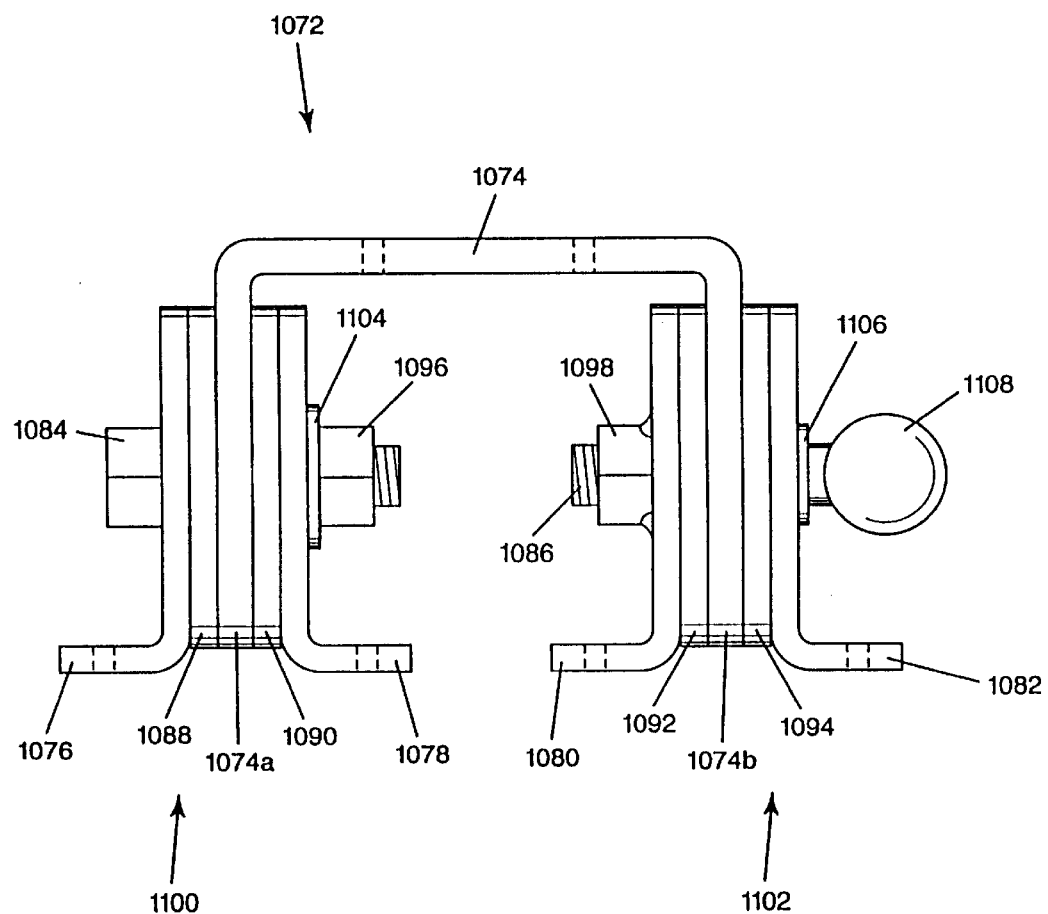
FIG. 27 illustrates a top view of the keyboard tray pivot brake assembly.

The friction assembly 1100 is now described. Bolt 1084 extends through angled bracket 1076, UHMWPE disk 1088, the left member 1074*a* of U-shaped bracket 1074, UHMWPE disk 1086, angled bracket 1078, and Belleville spring washer 1104 which are collectively frictionally secured via nut 1096 as shown in FIG. 27. A predetermined frictional force is thus established to insure that the tilting motion of keyboard tray 1010, shown in FIG. 25, remains in any position selected by the user. If the user wishes to reposition the tilt of the keyboard tray 1010, the keyboard tray 1010 must be manually repositioned to overcome the keyboard tray 1010 tilting friction established above. Once the keyboard tray 1010 is moved to a different selected position, the unique friction devices will resistably restrain the keyboard tray 1010 in its new position as selected. Sufficient friction to maintain position of the keyboard tray 1010 during preparation for use is provided but allows easy "breakaway" release to reposition the keyboard tray 1010 to a new operating position or to a storage position. The keyboard tray 1010 is locked into any position to provide increased stability using brake assembly 1102, which will be later described in detail, before the keyboard tray 1010 is used for mouse or keyboard input.

The unique characteristics of the polymer UHMWPE disks 1086 and 1088, in combination with a spring force supplied by Belleville washer 1104 allow smooth adjustment of the keyboard tray and yet provide a constant frictional memory for the preset position of the keyboard tray. A predetermined poise is required of the operator to move the keyboard tray, at which time it remains in the new position.

The brake assembly 1102 is now described. The brake handle 1108, having a threaded shaft 1086 which extends from the lower portion of the brake handle 1108 at a 90° angle, extends through washer 1106, shown in FIG. 27, angled bracket 1082, steel washer 1094, the right member 1074*b* of U-shaped bracket 1074, steel washer 1092, angled bracket 1080 which are collectively frictionally secured via nut 1098, which is welded to angled bracket 1080. Rotating brake handle 1108 will cause threaded shaft 1086 to turn in either direction, and either lessening the frictional tension, allowing for a new tilt position to be selected, or increasing the frictional tension, which will act as a brake mechanism, locking the keyboard tray 1010 into position.

FIG. 27 illustrates a top view of the pivot/brake assembly 1072, where all numerals correspond to those elements previously described.

Figure 28:
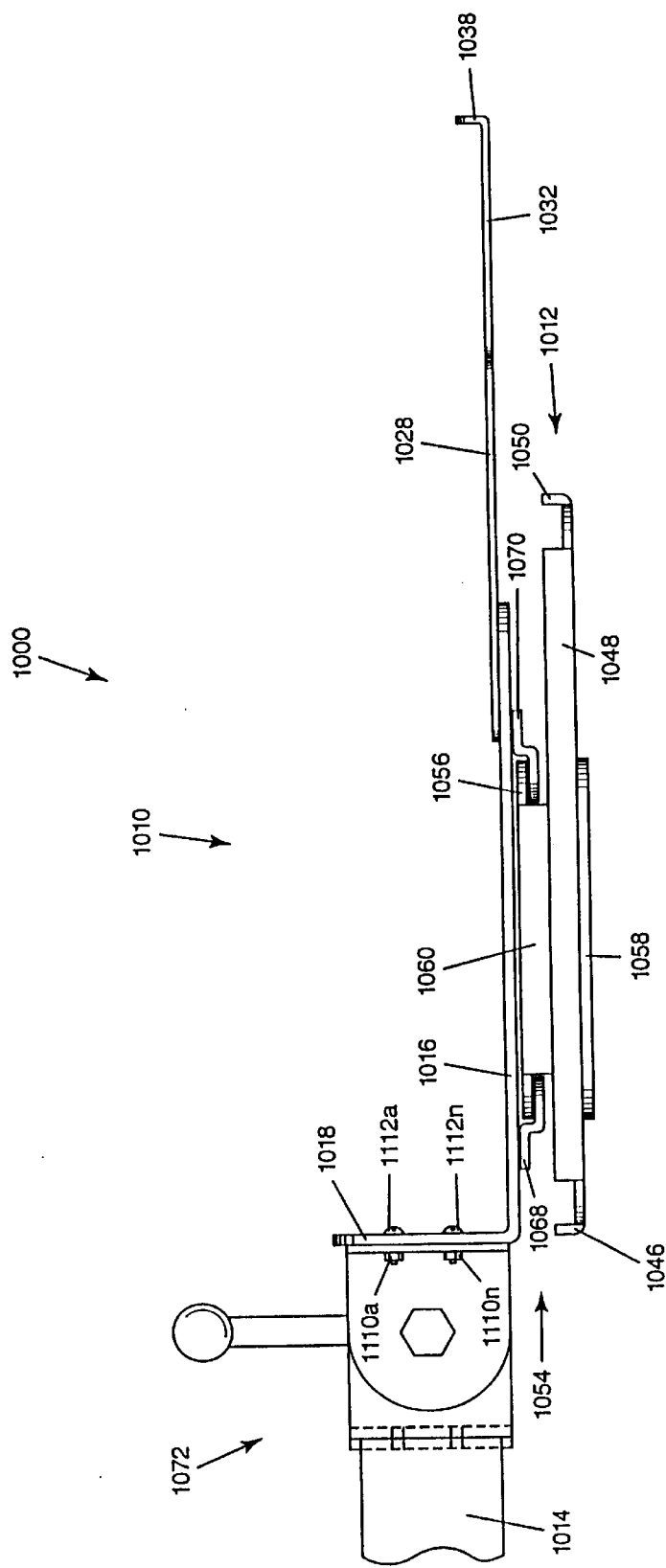
FIG. 28 illustrates a side view of the keyboard support system.

FIG. 28 illustrates an end view of the keyboard support system 1000, where all numerals correspond to those elements previously described. Illustrated in particular are the slide channels 1068 and 1070 where the contiguous slide plate 1054 of the mouse pad tray 1012 slidingly engages the keyboard tray 1010. The upper planar member 1056 of the mouse pad tray 1012 is captured by the slide channels 1068 and 1070.

Also illustrated in is a plurality of mounting bolts 1112*a*–1112*n* and nuts 1110*a*–1110*n*, which secure the mounting lip 1018 of the keyboard tray 1010 to the pivot/brake assembly 1072.

Figure 29:
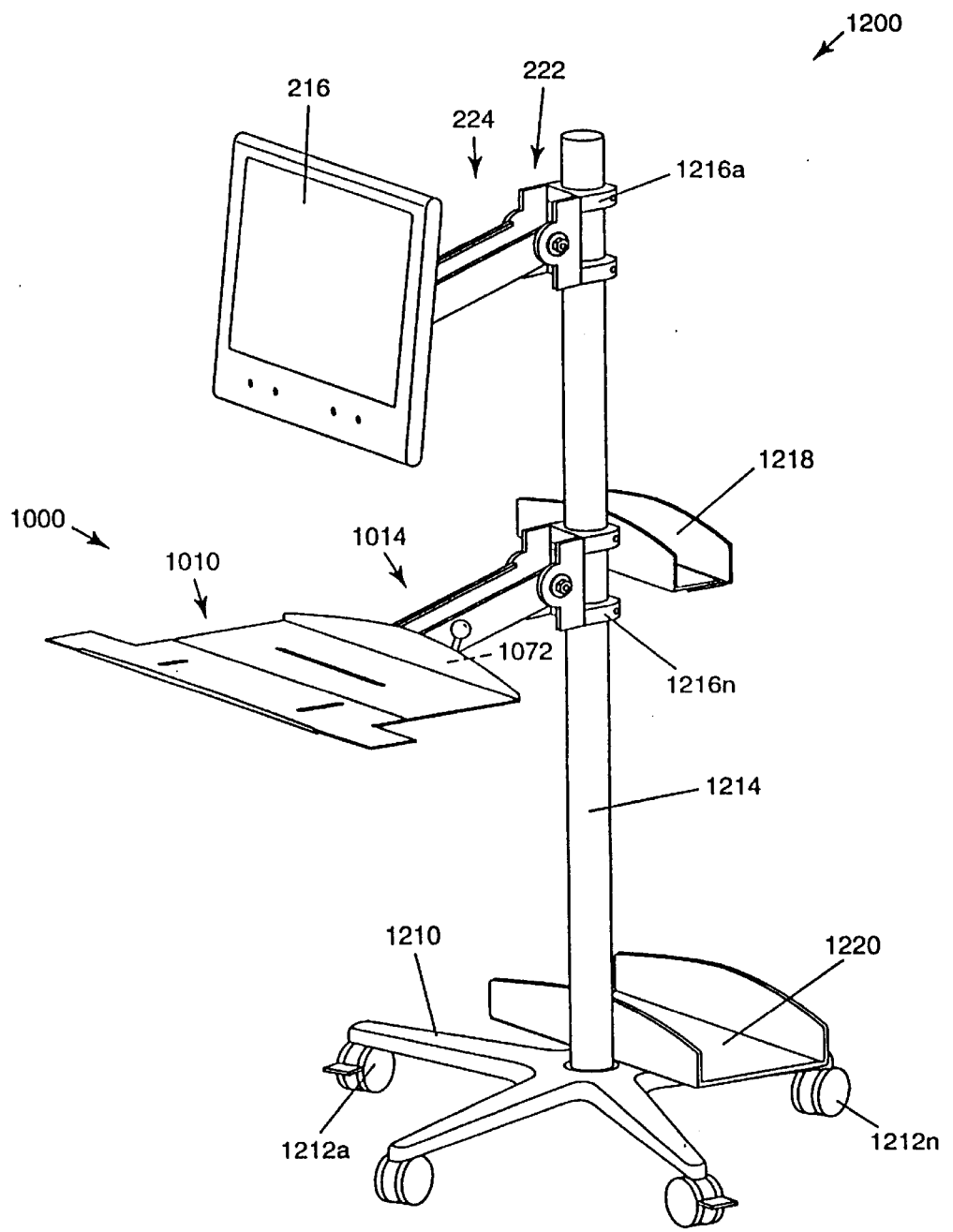
FIG. 29 a sixth alternative embodiment, illustrates a perspective view of a rolling cart assembly, whereon a flat panel display arm and keyboard arm are mounted.

FIG. 29 illustrates a perspective view of a rolling cart assembly 1200, where all numerals correspond to those elements previously described. The rolling cart assembly 1200 includes a base 1210 with a plurality of dual wheel casters 1212a–1212n which supports a mounting pole 1214. Secured to the mounting pole 1214, via a plurality of pole mount brackets 1216a–1216n, are the pivot support bracket 222 and the support arm 224 which supports flat panel display 216, support arm 1014 in connection with pivot/brake assembly 1072 and keyboard support system 1000. Also supported by the mounting pole 1214 is a CPU mounting bracket 1218. A UPS mounting bracket 1220 is secured to the base 1210 of the mounting pole 1214. The combination of these elements creates a mobile, easily adjustable, computer work station. The adjustability features of the rolling cart assembly 1200 allows the mobile work station to be easily adjusted for standing and sitting work applications, providing the ability to maintain a 16 inch or other desired separation between the monitor and keyboard in any position. The flat panel display arm 224 and support arm 1014 may be positioned vertically for easy storage, ease of mobility and other considerations.

Various modifications can be made to the present invention without departing from the apparent scope hereof.

MOUNTING SYSTEM FOR FLAT PANEL DISPLAY, KEYBOARD, AND STAND PARTS LIST

| Number | Description |
|---|---|
| 10 | flat panel display arm |
| 12 | track plate |
| 14 | track plate |
| 16 | flat panel display |
| 18 | angled bracket assembly |
| 20 | angled bracket assembly |
| 22 | pivot support bracket |
| 24 | support arm |
| 24a | inboard end |
| 24b | outboard end |
| 25 | gas spring |
| 26 | vertical axis |
| 28 | horizontal axis |
| 30 | three axis pivot |
| 32 | pivot assembly |
| 34 | pivot assembly |
| 36 | pivot assembly |
| 38 | bracket |
| 38a | planar portion |
| 40 | vertical axis |
| 42 | horizontal axis |
| 44 | roll axis |
| 46 | flange |
| 48 | flange |
| 50 | angle bracket |
| 52 | angle bracket |
| 54 | UHMWPE disk |
| 56 | UHMWPE disk |
| 58 | bolt |
| 59 | Belleville washer |
| 60 | Belleville washer |
| 62 | nut |
| 64 | angle bracket |
| 66 | angle bracket |
| 68 | angle bracket |
| 70 | angle bracket |
| 72 | UHMWPE disk |
| 74 | UHMWPE disk |
| 76 | bolt |
| 77 | Belleville washer |
| 78 | Belleville washer |
| 80 | nut |
| 82 | angle bracket |
| 84 | angle bracket |
| 86 | plate |
| 88 | UHMWPE disk |
| 90 | bolt |
| 92 | Belleville washer |
| 94 | nut |
| 96 | central bracket |
| 98 | angled support bracket |
| 100 | angled support bracket |
| 102 | central planar arm |
| 104 | planar member |
| 106 | planar member |
| 108 | UHMWPE disk |
| 110 | UHMWPE disk |
| 112 | left (support arm) member |
| 112a | disk-like portion |
| 112b | angular portion |
| 114 | right (support arm) member |
| 114a | disk-like portion |
| 114b | angular portion |
| 116 | captive stud |
| 118 | oilite bearing |
| 119 | oilite washer |
| 120 | oilite washer |
| 121 | hole |
| 122 | steel washer |
| 123 | hole |
| 124 | Belleville washer |
| 126 | nut |
| 128 | captive stud |
| 130 | disk-like bearing |
| 132 | steel washer |
| 134 | Belleville washer |
| 136 | nut |
| 142 | threaded shaft |
| 144 | nut |
| 146 | nut |
| 148 | slot |
| 150 | tab |
| 152 | tab |
| 154 | threaded hole |
| 156 | tab |
| 158 | tab |
| 160 | pivot bolt |
| 162 | tab, pivot |
| 164 | tab, pivot |
| 166 | bolt |
| 168 | washer |
| 170 | UHMWPE washer |
| 172 | threaded insert |
| 174 | bolt |
| 176 | washer |
| 178 | UHMWPE washer |
| 180 | threaded insert |
| 182 | semi-circular slot |
| 183 | outboard end |
| 184 | pivot pin |
| 186 | plastic spacer |
| 188 | plastic spacer |
| 190 | arc |
| 191 | pivot range |
| 210 | flat panel display arm |
| 216 | flat panel display |
| 222 | pivotal support bracket |
| 224 | support arm |
| 224a | inboard end |
| 224b | outboard end |
| 225 | gas spring |
| 228 | horizontal axis |
| 230 | single axis pivot |
| 238 | bracket |
| 240 | horizontal axis |
| 246 | vertically oriented flange |
| 248 | vertically oriented flange |
| 250 | angle bracket |
| 252 | angle bracket |

MOUNTING SYSTEM FOR FLAT PANEL DISPLAY, KEYBOARD, AND STAND PARTS LIST

| | |
|---|---|
| 254 | UHMWPE disk |
| 256 | UHMWPE disk |
| 258 | bolt |
| 259 | Belleville washer |
| 260 | Belleville washer |
| 262 | nut |
| 264 | angle bracket |
| 266 | angle bracket |
| 296 | central bracket |
| 302 | planar area |
| 304 | planar member |
| 304a | semi-circular members |
| 304b | bracket tab |
| 306 | planar member |
| 306a | semi-circular members |
| 306b | bracket tab |
| 308 | UHMWPE disk |
| 310 | UHMWPE disk |
| 312 | left member |
| 312a | disk-like portion |
| 312b | planar member |
| 312c | angled support member |
| 314 | right member |
| 316 | captive stud |
| 318 | oilite bearing |
| 319 | oilite washer |
| 320 | oilite bearing |
| 321 | hole |
| 322 | steel washer |
| 323 | hole |
| 324 | Belleville washer |
| 326 | nut |
| 328 | captive stud |
| 332 | steel washer |
| 334 | Belleville washer |
| 336 | nut |
| 340 | adjustable gas spring mount |
| 342 | threaded shaft |
| 344 | affixed nut |
| 346 | affixed nut |
| 348 | slot |
| 350 | tab |
| 352 | tab |
| 354 | threaded hole |
| 356 | tab |
| 358 | tab |
| 360 | pivot bolt |
| 383 | outboard end |
| 384 | pivot pin |
| 386 | plastic spacer |
| 388 | plastic spacer |
| 390 | arc |
| 400 | ceiling track mount |
| 402 | support bracket |
| 404 | track wheel |
| 405 | track wheel |
| 406 | track wheel |
| 407 | track wheel |
| 408 | pivot support bracket |
| 410 | vertical axis |
| 412 | bolt |
| 413 | Belleville washer |
| 414 | steel washer |
| 416 | UHMWPE disk |
| 418 | Belleville washer |
| 420 | nut |
| 422 | adjustable gas spring mount |
| 424 | threaded shaft |
| 426 | nut |
| 428 | nut |
| 430 | single axis pivot |
| 432 | flat panel display arm |
| 510 | tabletop flat panel display |
| 512 | angled base |
| 514 | recessed hole |
| 516 | flat panel display |
| 522 | pivot support bracket assembly |
| 523 | vertical axis |
| 524 | support arm |
| 525 | gas spring |
| 530 | single axis pivot |
| 546 | flange |
| 548 | flange |
| 550 | angle bracket |
| 552 | angle bracket |
| 554 | UHMWPE disk |
| 556 | UHMWPE disk |
| 558 | bolt |
| 559 | Belleville washer |
| 560 | Belleville washer |
| 562 | nut |
| 564 | angle bracket |
| 566 | angle bracket |
| 604 | bracket planar member |
| 606 | bracket planar member |
| 608 | UHMWPE disk |
| 610 | UHMWPE disk |
| 612 | left support arm member |
| 612a | disk-like portion |
| 614 | right support arm member |
| 614a | disk-like portion |
| 616 | captive stud |
| 622 | steel washer |
| 624 | Belleville washer |
| 626 | nut |
| 628 | captive stud |
| 632 | steel washer |
| 634 | Belleville washer |
| 636 | nut |
| 640 | gas spring mount |
| 660 | pivot bolt |
| 684 | pivot pin |
| 686 | plastic spacer |
| 688 | plastic spacer |
| 690 | nut |
| 692 | nut |
| 694 | bolt |
| 696 | Belleville washer |
| 698 | steel washer |
| 700 | UHMWPE disk |
| 702 | Belleville washer |
| 704 | nut |
| 800 | tabletop flat panel display with steel coil spring |
| 802 | support arm |
| 810 | steel coil spring |
| 1000 | keyboard support systm |
| 1010 | keyboard tray |
| 1012 | mouse pad tray |
| 1014 | support arm |
| 1016 | fixed portion |
| 1018 | mounting lip |
| 1020a–n | mounting holes |
| 1021a–n | nut and screw hardware |
| 1022 | cable access hole |
| 1024 | cable access hole |
| 1026 | cable access hole |
| 1028 | slide plate |
| 1030 | right extended member |
| 1032 | left extended member |
| 1034 | slotted hole |
| 1036 | slotted hole |
| 1038 | lip |
| 1040 | machine screws |
| 1042 | machine screws |
| 1044 | planar surface |
| 1046 | lip |
| 1048 | lip |
| 1050 | lip |
| 1052 | lip |
| 1054 | contiguous slide plate |
| 1056 | upper planar member |
| 1057 | machine screw stud |

-continued

MOUNTING SYSTEM FOR FLAT
PANEL DISPLAY, KEYBOARD, AND STAND
PARTS LIST

| | |
|---|---|
| 1058 | lower planar member |
| 1060 | intermediate portion |
| 1062 | slotted hole |
| 1064 | machine screw |
| 1064a | knob |
| 1066 | machine screw |
| 1066a | knob |
| 1067 | knob |
| 1068 | slide channel |
| 1070 | slide channel |
| 1072 | pivot brake assembly |
| 1074 | U-shaped bracket |
| 1074a | angled bracket |
| 1078 | angled bracket |
| 1080 | angled bracket |
| 1082 | angled bracket |
| 1084 | bolt |
| 1086 | threaded shaft |
| 1088 | UHMWPE disk |
| 1090 | UHMWPE disk |
| 1092 | steel washer |
| 1094 | steel washer |
| 1096 | nut |
| 1098 | nut |
| 1100 | friction assembly |
| 1102 | brake assembly |
| 1104 | Belleville spring washer |
| 1106 | washer |
| 1108 | brake handler |
| 1110a–n | nuts |
| 1112a–n | mounting bolts |
| 1200 | rolling cart assembly |
| 1210 | base |
| 1212a–n | casters |
| 1214 | mounting pole |
| 1216a–n | pole mounting brackets |
| 1218 | CPU mounting bracket |
| 1220 | UPS mounting bracket |

We claim:

1. A mounting system attachable to a vertical or horizontal surface, the mounting system being suitable for supporting a flat panel display screen, a keyboard, or other computer component, the mounting system comprising:

a. a component mount suitable for supportingly engaging a display screen, keyboard, or other computer component;

b. a pivoting bracket assembly comprising a tilt bracket attached to said component mount, said tilt bracket comprising:
      (1) at least two planar metal surfaces that rotatingly move with respect to each other;
      (2) at least one easy breakaway frictional polymer disk located between said at least two metal surfaces;
      (3) at least one spring washer located adjacent and outside an outer surface of said at least two metal surfaces; and,
      (4) said at least two metal surfaces, said at least one easy breakaway frictional polymer disk, and said at least one spring washer being held under tension by a nut and a bolt;

c. a support arm with an inboard end and an outboard end and a central portion, said outboard end being tiltingly pivotably attached to said pivoting bracket assembly;

d. an arm elevation bracket attached to said inboard end of said support arm, said support arm being elevationally pivotable with said arm elevation bracket;

e. a gas spring with an inboard end and an outboard end, said inboard end being pivotally and adjustably connected to said arm elevation bracket, and said outboard end being pivotally connected to said central portion of said support arm; and, f. a surface mount attached to said arm elevation bracket for mounting said mounting system to said vertical or horizontal surface.

2. The mounting system of claim 1, wherein said at least one easy breakaway frictional polymer disk has a similar static and dynamic coefficient of friction is fabricated from a material selected from a group consisting of ultra high molecular weight polyethylene (UHMWPE) and Delrin.

3. The mounting system of claim 1, wherein said at least one spring washer is a Belleville washer.

4. The mounting system of claim 1, wherein the adjustable connection of the inboard end of the gas spring allows the gas spring to be optimally positioned with respect to the arm elevational bracket such that the gas spring is capable of providing a dynamically changing counterbalance moment to the support arm corresponding to a changing moment force applied by the flat panel display screen as the support arm pivots on said arm elevation bracket.

5. The system of claim 1, wherein said gas spring is located within said support arm and is positionally connected to said elevation bracket to provide a dynamically changing counterbalance moment corresponding to an increasing or decreasing moment load as said support arm pivots about said elevation bracket.

6. The mounting system of claim 1, wherein said gas spring provides a counterbalance force to the support arm over a range of up to 180 degrees of motion of the support arm about the elevation bracket.

7. The mounting system of claim 1, wherein said gas spring comprises nitrogen.

8. The mounting system of claim 1, wherein said at least one breakaway frictional polymer disk is fabricated from UHMWPE such that a frictional force between said UHMWPE disk and said at least two planar metal surfaces prevents unforced rotational movement of one planar metal surface with respect to the other planar metal surface and such that a low breakaway force exists between said at least two planar metal surfaces to provide ease of rotational movement of said one metal surface with respect to said other metal surface under a predetermined force.

9. The mounting system of claim 1, wherein said inboard end of said gas spring is pivotally connected to said arm elevation bracket at a position that is lower than the position of said inboard end of said support arm, wherein said gas spring provides a counterbalancing moment to support said computer component over an angular range of positions of said support arm about said arm elevational bracket.

10. The mounting system of claim 9, wherein said at least one easy breakaway frictional polymer disk has a similar static and dynamic coefficient of friction and is fabricated from a material selected a group consisting of ultra high molecular weight polyethylene (UHMWPE) and Delrin.

11. The mounting system of claim 9, wherein said at least one spring washer is a Belleville washer.

12. The mounting system of claim 9, wherein said inboard end of said gas spring is positionally connected at an optimal position to said arm elevation bracket and said arm elevation bracket is optimally angled to provide a linear counterbalancing force as said support arm is elevationally pivoted throughout its range of motion for the range of loads mountable on said support arm.

13. The system of claim 9, wherein said gas spring is located within said support arm and is positionally connected to said elevation bracket to provide a dynamically changing counterbalance moment corresponding to an increasing or decreasing moment load as said support arm pivots about said elevation bracket.

14. The mounting system of claim 9, wherein said gas spring provides a counterbalance force to the support arm over a range of up to 180 degrees of motion of the support arm about the elevation bracket.

15. The mounting system of claim 9, wherein said at least one breakaway frictional polymer disk is fabricated from UHMWPE such that a frictional force between said UHMWPE disk and said at least two planar metal surfaces prevents unforced rotational movement of one planar metal surface with respect to the other planar metal surface and such that a low breakaway force exists between said at least two planar metal surfaces to provide ease of rotational movement of said one metal surface with respect to said other metal surface under a predetermined force.

16. The mounting system of claim 9, wherein said angular range of positions of said support arm is 180 degrees of vertical movement with a low repositioning force and a low breakaway force.

17. The mounting system of claim 16, wherein said at least one easy breakaway frictional polymer disk has a similar static and dynamic coefficient of friction and is fabricated from the material selected a group consisting of ultra high molecular weight polyethylene (UHMWPE) and Delrin.

18. The mounting system of claim 16, wherein said at least one spring washer is a Belleville washer.

19. The mounting system of claim 16, wherein said inboard end of said gas spring is positionally connected at an optimal position to said arm elevation bracket and said arm elevation bracket is optimally angled to provide a linear counterbalancing force as said support arm is elevationally pivoted throughout its range of motion for the range of loads mountable on said support arm.

20. The system of claim 16, wherein said gas spring is located within said support arm and is positionally connected to said elevation bracket to provide a dynamically changing counterbalance moment corresponding to an increasing or decreasing moment load as said support arm pivots about said elevation bracket.

21. The mounting system of claim 16, wherein said gas spring provides a counterbalance force to the support arm over a range of up to 180 degrees of motion of the support arm about the elevation bracket.

22. The mounting system of claim 16, wherein said at least one breakaway frictional polymer disk is fabricated from UHMWPE such that a frictional force between said UHMWPE disk and said at least two planar metal surfaces prevents unforced rotational movement of one planar metal surface with respect to the other planar metal surface and such that a low breakaway force exists between said at least two planar metal surfaces to provide ease of rotational movement of said one metal surface with respect to said other metal surface under a predetermined force.

23. A mounting system attachable to a vertical or horizontal surface, the mounting system suitable for supporting a flat panel display screen, a keyboard, or other computer component, the mounting system comprising:
   a. a component mount, the component mount being suitable for supportingly engaging a display screen, keyboard, or other computer component;
   b. a pivoting bracket assembly comprising a tilt bracket attached to said component mount, said tilt bracket comprising:
      (1) at least two planar metal surfaces that rotatingly move with respect to each other;
      (2) at least one easy breakaway frictional polymer disk located between said at least two metal surfaces;
      (3) at least one spring washer located adjacent and outside an outer surface of said at least two metal surfaces; and,
      (4) said at least two metal surfaces, at least one easy breakaway frictional polymer disk, and at least one spring washer being held under tension by a nut and a bolt;
   c. a support arm with an inboard end and an outboard end and a central portion, said outboard end being tiltingly pivotable to said pivoting bracket assembly;
   d. an arm elevation bracket attached to said inboard end of said support arm, said support arm being elevationally pivotable with said elevation bracket;
   e. said arm elevation bracket comprising:
      (1) at least two planar metal surfaces that rotatingly move with respect to each other;
      (2) at least one easy breakaway frictional polymer disk located between said at least two metal surfaces;
      (3) at least one spring washer located adjacent and outside an outer surface of said at least two metal surfaces;
      (4) said at least two metal surfaces, said at least one easy breakaway frictional polymer disk, and said at least one spring washer being held under tension by a nut and a bolt; and,
      (5) said arm elevation bracket providing a frictional force to hold said support arm in place and yet provide a low repositioning force;
   f. a gas spring with an inboard end and an outboard end, said inboard end being pivotally connected to said arm elevation bracket, and said outboard end being pivotally connected to said central portion of said support arm, said gas spring providing a counterbalancing force to said support arm;
   g. a combination of both said gas spring and said frictional force of said elevation bracket providing for a counterbalancing force to said computer component and a frictional force providing positional stability; and,
   h. a surface mount attached to said arm elevation bracket for mounting said mounting system to said vertical or horizontal surface.

24. The mounting system of claim 23, wherein said at least one easy breakaway frictional polymer disk has a similar static and dynamic coefficient of friction is fabricated from a material selected a group consisting of ultra high molecular weight polyethylene (UHMWPE) and Delrin.

25. The mounting system of claim 23, wherein said at least one spring washer is a Belleville washer.

26. The mounting system of claim 23, wherein said inboard end of said gas spring is positionally connected at an optimal position to said arm elevation bracket and said arm elevation bracket is optimally angled to provide a linear counterbalancing force as said support arm is elevationally pivoted throughout its range of motion for the range of loads mountable on said support arm.

27. The system of claim 23, wherein said gas spring is located within said support arm and is positionally connected to said elevation bracket to provide a dynamically changing counterbalance moment corresponding to an increasing or decreasing moment load as said support arm pivots about said elevation bracket.

28. The mounting system of claim 23, wherein said gas spring provides a counterbalance force to the support arm over a range of up to 180 degrees of motion of the support arm about the elevation bracket.

29. The mounting system of claim 23, wherein said at least one breakaway frictional polymer disk is fabricated from UHMWPE such that a frictional force between said UHMWPE disk and said at least two planar metal surfaces prevents unforced rotational movement of one planar metal surface with respect to the other planar metal surface and such that a low breakaway force exists between said at least two planar metal surfaces to provide ease of rotational movement of said one metal surface with respect to said other metal surface under a predetermined force.

30. A mounting system, the mounting system being attachable to a vertical surface and suitable for supporting a flat panel display screen, the mounting system comprising:
 a. a component mount, the component mount being suitable for attachment to a flat panel screen;
 b. a pivoting bracket assembly comprising a tilt bracket attached to said component mount, said tilt bracket comprising:
  (1) at least two planar metal surfaces that rotatingly move with respect to each other;
  (2) at least one easy breakaway frictional polymer disk located between said at least two metal surfaces;
  (3) at least one spring washer located adjacent and outside an outer surface of said at least two metal surfaces; and,
  (4) said at least two metal surfaces, said at least one easy breakaway frictional polymer disk, and said at least one spring washer being held under tension by a nut and a bolt;
 c. a support arm with an inboard end and an outboard end and a central portion, said outboard end being tiltingly pivotable to said pivoting bracket assembly;
 d. an arm elevation bracket attached to said inboard end of said support arm, said support arm being elevationally pivotable with said elevation bracket;
 e. a gas spring with an inboard end and an outboard end, said inboard end being pivotally connected to said arm elevation bracket, and said outboard end being pivotally connected to said central portion of said support arm; and,
 f. a surface mount attached to said arm elevation bracket for mounting said mounting system to said vertical surface.

31. The mounting system of claim 30, wherein said at least one easy breakaway frictional polymer disk has a similar static and dynamic coefficient of friction and is fabricated from the material selected a group consisting of ultra high molecular weight polyethylene (UHMWPE) and Delrin.

32. The mounting system of claim 30, wherein said at least one spring washer is a Belleville washer.

33. The mounting system of claim 30, wherein said inboard end of said gas spring is positionally connected at an optimal position to said arm elevation bracket and said arm elevation bracket is optimally angled to provide a linear counterbalancing force as said support arm is elevationally pivoted throughout its range of motion for the range of loads mountable on said support arm.

34. The system of claim 30, wherein said gas spring is located within said support arm and is positionally connected to said elevation bracket to provide a dynamically changing counterbalance moment corresponding to an increasing or decreasing moment load as said support arm pivots about said elevation bracket.

35. The mounting system of claim 30, wherein said gas spring provides a counterbalance force to the support arm over a range of up to 180 degrees of motion of the support arm about the elevation bracket.

36. The mounting system of claim 30, wherein said at least one breakaway frictional polymer disk is fabricated from UHMWPE such that a frictional force between said UHMWPE disk and said at least two planar metal surfaces prevents unforced rotational movement of one planar metal surface with respect to the other planar metal surface and such that a low breakaway force exists between said at least two planar metal surfaces to provide ease of rotational movement of said one metal surface with respect to said other metal surface under a predetermined force.

37. A mounting system, the mounting system being attachable to a vertical surface and suitable for supporting a flat panel display screen, the mounting system comprising:
 a. a component mount, the component mount being suitable for attachment to a flat panel display screen;
 b. a pivoting bracket comprising:
  (1) a tilt bracket attached to said component mount, said tilt bracket allowing a tilting movement of said flat panel display about a tilting horizontal axis; and,
  (2) said tilt bracket comprising, in order:
   a nut, a Belleville washer, a planar metal surface, an UHMWPE disk, a planar metal surface, an UHMWPE disk, a planar metal surface, a Belleville washer, and a bolt;
 c. a support arm with an inboard end and an outboard end and a central portion, said outboard end being tiltingly pivotable to said pivoting bracket;
 d. an arm elevation bracket attached to said inboard end of said support arm, said support arm being elevationally pivotable with said elevation bracket, said arm elevation bracket comprising a threaded shaft;
 e. said arm elevation bracket further comprising, in order:
  a nut, a Belleville washer, a steel washer, an oilite washer, a planar metal surface, an UHMWPE disk, a planar metal surface of said support arm, and a bolt;
 f. said arm elevation bracket providing a frictional force to hold said support arm in place and yet provide a low repositioning force;
 g. a gas spring with an inboard end and an outboard end, said inboard end being pivotally and adjustably connected to said threaded shaft of said arm elevation bracket, and said outboard end being pivotally connected to said central portion of said support arm; and,
 h. a surface mount attached to said arm elevation bracket for mounting said mounting system to said vertical or horizontal surface.

38. The mounting system of claim 37, wherein said inboard end of said gas spring is positionally connected along said threaded shaft and said threaded shaft is mounted at an angle with respect to a true vertical direction, the angle providing an optimum counterbalancing force for supporting said support arm.

39. The mounting system of claim 37, wherein said inboard end of said gas spring is positionally connected at an optimal position to said arm elevation bracket to provide a counterbalancing moment as said support arm is elevationally pivoted throughout a range of pivoting angles.

40. The mounting system of claim 37, wherein said gas spring provides a counterbalance force to the support arm over a range of up to 180 degrees of motion of the support arm about the elevation bracket.

41. The mounting system of claim 37, wherein said at least one breakaway frictional polymer disk is fabricated from UHMWPE such that a frictional force between said UHMWPE disk and said at least two planar metal surfaces prevents unforced rotational movement of one planar metal surface with respect to the other planar metal surface and such that a low breakaway force exists between said at least two planar metal surfaces to provide ease of rotational movement of said one metal surface with respect to said other metal surface under a predetermined force.

42. The mounting system of claim 37, wherein said at least one breakaway frictional polymer disk is fabricated from UHMWPE such that a frictional force between said UHMWPE disk and said at least two planar metal surfaces prevents unforced rotational movement of one planar metal surface with respect to the other planar metal surface and such that a low breakaway force exists between said at least two planar metal surfaces to provide ease of rotational movement of said one metal surface with respect to said other metal surface under a predetermined force.

* * * * *